US011258546B2

(12) United States Patent
Fakoorian et al.

(10) Patent No.: US 11,258,546 B2
(45) Date of Patent: Feb. 22, 2022

(54) ACKNOWLEDGMENT FEEDBACK TECHNIQUES IN WIRELESS COMMUNICATIONS

(71) Applicant: QUALCOMM Incorporated, San Diego, CA (US)

(72) Inventors: Seyed Ali Akbar Fakoorian, San Diego, CA (US); Seyedkianoush Hosseini, San Diego, CA (US); Xiaoxia Zhang, San Diego, CA (US); Jing Jiang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/698,298

(22) Filed: Nov. 27, 2019

(65) Prior Publication Data

US 2020/0177323 A1 Jun. 4, 2020

Related U.S. Application Data

(60) Provisional application No. 62/773,824, filed on Nov. 30, 2018.

(51) Int. Cl.
*H04L 1/18* (2006.01)
*H04L 5/00* (2006.01)
*H04W 72/04* (2009.01)

(52) U.S. Cl.
CPC .......... *H04L 1/1854* (2013.01); *H04L 1/1832* (2013.01); *H04L 5/0007* (2013.01);
(Continued)

(58) Field of Classification Search
CPC ... H04L 1/1854; H04L 1/1832; H04L 5/0007; H04L 5/0055; H04W 72/0413; H04W 72/042
See application file for complete search history.

(56) References Cited

U.S. PATENT DOCUMENTS

2019/0165894 A1* 5/2019 Choi ........................ H04J 11/00
2019/0246395 A1* 8/2019 Huang .............. H04W 72/0446
(Continued)

FOREIGN PATENT DOCUMENTS

WO   WO-2019216620 A1   11/2019

OTHER PUBLICATIONS

Huawei, et al., "UCI Enhancements for URLLC", 3GPP Draft, 3GPP TSG RAN WG1 Meeting #95, R1-1813986, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 13, 2018 (Nov. 13, 2018), XP051480171, 7 Pages, Retrieved from the Internet: URL: http://www.3gpp.org/ftp/tsg%5Fran/WG1%5FRL1/TSGR1%5F95/Docs/R1%2D1813986%2Ezip [retrieved on Nov. 13, 2018], Sections 2.1-2.2.

(Continued)

*Primary Examiner* — Michael J Moore, Jr.
(74) *Attorney, Agent, or Firm* — Holland & Hart, LLP

(57) ABSTRACT

Methods, systems, and devices for wireless communications are described that provide for unambiguous mapping between downlink control channel transmissions, downlink shared channel transmissions, and uplink acknowledgment feedback resources. The uplink acknowledgment feedback resource may be located within a same transmission time interval (TTI). A base station may configure codebook-based acknowledgment resources from a user equipment (UE), and feedback delay values may be associated with time domain resources of the downlink shared channel transmissions. In some examples, feedback delay values may be associated with particular search spaces or monitoring occasions of the downlink control channel transmissions that include resource allocations for the downlink shared channel transmissions. A UE using codebook-based acknowledgment feedback resources may thus unambiguously identify uplink resources that are to be used for transmitting the uplink acknowledgment feedback.

44 Claims, 22 Drawing Sheets

(52) U.S. Cl.
CPC ......... *H04L 5/0055* (2013.01); *H04W 72/042* (2013.01); *H04W 72/0413* (2013.01)

(56) References Cited

U.S. PATENT DOCUMENTS

| | | | | |
|---|---|---|---|---|
| 2019/0363840 | A1* | 11/2019 | Wang | H04L 1/1861 |
| 2020/0022161 | A1* | 1/2020 | Yang | H04W 72/0413 |
| 2020/0053766 | A1* | 2/2020 | Chien | H04W 72/0446 |
| 2020/0059327 | A1* | 2/2020 | Kini | H04W 72/042 |
| 2020/0106586 | A1* | 4/2020 | Nemeth | H04L 1/1812 |
| 2020/0145167 | A1* | 5/2020 | Jung | H04L 5/0007 |
| 2020/0213046 | A1* | 7/2020 | Wang | H04L 1/1861 |
| 2020/0229211 | A1* | 7/2020 | Hosseini | H04L 47/41 |
| 2020/0295878 | A1* | 9/2020 | Choi | H04W 72/1289 |
| 2020/0344032 | A1* | 10/2020 | Yang | H04L 5/0094 |
| 2020/0367265 | A1* | 11/2020 | Wang | H04L 5/0051 |
| 2021/0306107 | A1* | 9/2021 | Yin | H04L 1/1864 |
| 2021/0314095 | A1* | 10/2021 | Gao | H04L 1/1887 |

OTHER PUBLICATIONS

International Search Report and Written Opinion—PCT/US2019/063817—ISA/EPO—dated Feb. 24, 2020.

MediaTek Inc: "Evaluations and Enhancements of NR Control Channels for URLLC", 3GPP Draft, 3GPP TSG RAN WG1 Meeting #94bis, R1-1810463 Evaluations and Enhancements of NR Control Channels for URLLC, 3rd Generation Partnership Project (3GPP), Mobile Competence Centre, 650, Route Des Lucioles, F-06921 Sophia-Ant, vol. RAN WG1, No. Chengdu, China, Oct. 8, 2018-Oct. 12, 2018, Sep. 29, 2018 (Sep. 29, 2018), XP051517872, 10 Pages, Retrieved from the Internet: URL: http://www.3gpp.org/ftp/tsg%5Fran/WG1%5FRL1/TSGR1%5F94b/Docs/R1%2D1810463%2Ezip [retrieved on Sep. 29, 2018], Section 4.

Vivo: "DL Intra UE Tx Prioritization for URLLC", 3GPP Draft, 3GPP TSG RAN WG1 Meeting #95, R1-1812321 DL Intra UE Tx Prioritization for URLLC, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554226, 4 Pages, Retrieved from the Internet: URL: http://www.3gpp.org/ftp/Meetings%5F3GPP%5FSYNC/RAN1/Docs/R1%2D1812321%2Ezip [retrieved on Nov. 11, 2018], Section 2.

ZTE: "UL Control Enhancements for URLLC", 3GPP Draft, 3GPP TSG RAN WG1 Meeting #95, R1-1812385 UL Control Enhancements for URLLC, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554303, 7 Pages, Retrieved from the Internet: URL: http://www.3gpp.org/ftp/Meetings%5F3GPP%5FSYNC/RAN1/Docs/R1%2D1812385%2Ezip [retrieved on Nov. 11, 2018], Section 2.

* cited by examiner

| Row Index | $K_0$ | Mapping Type | SLIV | DL Data to UL Ack (subslot) |
|---|---|---|---|---|
| ... | ... | ... | ... | ... |
| i | 0 | B | S=12, L=2 | {0, 1, 3, 5, 7, 8, 11, 15} |
| j | 0 | A | S=2, L=9 | {2, 4, 8, 10, 16, 20, 30, 40} |
| ... | ... | ... | ... | ... |

ACKNOWLEDGMENT FEEDBACK TECHNIQUES IN WIRELESS COMMUNICATIONS

CROSS REFERENCE

The present application for Patent claims the benefit of U.S. Provisional Patent Application No. 62/773,824 by FAKOORIAN, et al., entitled "ACKNOWLEDGMENT FEEDBACK TECHNIQUES IN WIRELESS COMMUNICATIONS," filed Nov. 30, 2018, assigned to the assignee hereof, and expressly incorporated herein.

BACKGROUND

The following relates generally to wireless communications, and more specifically to acknowledgment feedback techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may implement control messages (e.g., PDCCH messages transmitted by a base station) to grant upcoming resources for data transmissions (e.g., where the data transmissions are sent over a physical downlink shared channel (PDSCH)). If a UE receives and successfully decodes a PDCCH message, the UE may then receive and decode a data transmission in the data resources indicated by the PDCCH message, and transmit acknowledgment feedback to the base station to indicate successful or unsuccessful receipt of the data transmission. However, if the UE fails to receive or decode the PDCCH transmission indicating the PDSCH resources, the UE may not even attempt to receive the data transmission and not transmit the acknowledgment feedback. Such a lack of feedback may indicate to the base station that the PDCCH transmission was not received at the UE. In some cases uplink acknowledgment resources may not be explicitly assigned to a UE, and the UE may determine such resources through a codebook that maps uplink acknowledgment feedback resources to downlink transmissions based on downlink resources used for the downlink data transmission.

SUMMARY

The described techniques relate to improved methods, systems, devices, and apparatuses that support acknowledgment feedback techniques in wireless communications. Various aspects of the present disclosure provide techniques for unambiguous mapping between downlink control channel transmissions, downlink shared channel transmissions, and uplink acknowledgment feedback resources. In some cases, codebook-based acknowledgment resources may be configured for transmission of uplink acknowledgment feedback from a user equipment (UE), and feedback delay values (e.g., $K_1$ delay values for a number of slots or sub-slots between a downlink shared channel transmission and an associated uplink acknowledgment feedback) may be associated with time domain resources of the downlink shared channel transmissions. Additionally or alternatively, feedback delay values may be associated with particular search spaces or monitoring occasions of the downlink control channel transmissions that include resource allocations for the downlink shared channel transmissions. A UE using codebook-based acknowledgment feedback resources may thus unambiguously identify uplink resources that are to be used for transmitting the uplink acknowledgment feedback.

A method of wireless communication is described. The method may include identifying, at a UE, a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel, determining, based on the first set of delay values, a first time domain resource allocation of downlink shared channel resources associated with the first acknowledgment feedback, and transmitting the first acknowledgment feedback for the first time domain resource allocation via the first set of uplink resources.

An apparatus for wireless communication is described. The apparatus may include a processor, memory in electronic communication with the processor, and instructions stored in the memory. The instructions may be executable by the processor to cause the apparatus to identify, at a UE, a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel, determine, based on the first set of delay values, a first time domain resource allocation of downlink shared channel resources associated with the first acknowledgment feedback, and transmit the first acknowledgment feedback for the first time domain resource allocation via the first set of uplink resources.

Another apparatus for wireless communication is described. The apparatus may include means for identifying, at a UE, a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel, determining, based on the first set of delay values, a first time domain resource allocation of downlink shared channel resources associated with the first acknowledgment feedback, and transmitting the first acknowledgment feedback for the first time domain resource allocation via the first set of uplink resources.

A non-transitory computer-readable medium storing code for wireless communication is described. The code may include instructions executable by a processor to identify, at a UE, a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel, determine, based on the first set of delay values, a first time domain resource allocation of downlink shared channel resources associated with the first acknowledgment feedback, and transmit the first acknowledgment feedback for the first time domain resource allocation via the first set of uplink resources.

In some examples of the method, apparatuses, and non-transitory computer-readable medium described herein, the first set of delay values may be associated with a first wireless service having a first TTI, and the second set of delay values may be associated with a second wireless service having a second TTI that may be shorter than the first TTI.

Some examples of the method, apparatuses, and non-transitory computer-readable medium described herein may further include operations, features, means, or instructions for determining, based on the second set of delay values, a second time domain resource allocation of downlink shared channel resources associated with the second acknowledgment feedback, where the second time domain resource allocation may have a same ending orthogonal frequency division multiplexing (OFDM) symbol as the first time domain resource allocation, and transmitting the second acknowledgment feedback for the second time domain resource allocation via a second set of uplink resources that may be different than the first set of uplink resources. In some examples of the method, apparatuses, and non-transitory computer-readable medium described herein, the first set of uplink resources and the second set of uplink resources may be different uplink resources within a same slot.

In some examples of the method, apparatuses, and non-transitory computer-readable medium described herein, the identifying may include operations, features, means, or instructions for receiving, from the base station, configuration information that configures the first set of delay values and the second set of delay values. In some examples of the method, apparatuses, and non-transitory computer-readable medium described herein, the configuration information includes a downlink shared channel time domain resource allocation list that links the first time domain resource allocation with the first set of delay values and that links a second time domain resource allocation of downlink shared channel resources with the second set of delay values.

In some examples of the method, apparatuses, and non-transitory computer-readable medium described herein, the first set of delay values and the second set of delay values may be provided in a downlink data to uplink acknowledgment table that may be provided with the downlink shared channel time domain resource allocation list. In some examples of the method, apparatuses, and non-transitory computer-readable medium described herein, the first set of delay values and the second set of delay values may have same or different units for measuring time domain differences between a downlink data transmission and the first set of uplink resources. In some examples the units for measuring time domain differences include one or more of slots, sub-slots, orthogonal frequency division multiplexing (OFDM) symbols, or any combinations thereof. In some examples of the method, apparatuses, and non-transitory computer-readable medium described herein, the first set of delay values correspond to downlink shared channel time domain resources that span a first number of orthogonal frequency division multiplexing (OFDM) symbols and the second set of delay values correspond to downlink shared channel time domain resources that span a second number of OFDM symbols. In some examples of the method, apparatuses, and non-transitory computer-readable medium described herein, the first number of OFDM symbols span more than a threshold number of OFDM symbols and the second number of OFDM symbols may be less than or equal to the threshold number of OFDM symbols. In some examples of the method, apparatuses, and non-transitory computer-readable medium described herein, the second number of OFDM symbols may be included in an enumerated set of numbers of OFDM symbols, and the first number of OFDM symbols correspond to other available numbers of OFDM symbols outside of the enumerated set of numbers of OFDM symbols.

In some examples of the method, apparatuses, and non-transitory computer-readable medium described herein, a set of overlapping downlink data transmissions from the base station each end during a same transmission time interval, and the first acknowledgment feedback may be associated with latest starting data transmission of the set of overlapping downlink data transmissions. In some examples of the method, apparatuses, and non-transitory computer-readable medium described herein, a set of overlapping downlink data transmissions from the base station each end during a same transmission time interval, and the first acknowledgment feedback may be associated with a data transmission of the set of overlapping downlink data transmissions that may have a shortest time duration.

A method of wireless communication is described. The method may include identifying, at a UE, a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station, receiving a first downlink control channel transmission during the first set of downlink control channel monitoring occasions that indicates a first downlink shared channel resource for a first downlink data transmission to the UE, determining, based on the first set of delay values, a first uplink resource for transmitting a first acknowledgment feedback associated with the first downlink data transmission, monitoring the first downlink shared channel resource for the first downlink data transmission, and transmitting, based on the monitoring, the first acknowledgment feedback to the base station via the first uplink resource.

An apparatus for wireless communication is described. The apparatus may include a processor, memory in electronic communication with the processor, and instructions stored in the memory. The instructions may be executable by the processor to cause the apparatus to identify, at a UE, a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station, receive a first downlink control channel transmission during the first set of downlink control channel monitoring occasions that indicates a first downlink shared channel resource for a first downlink data transmission to the UE, determine, based on the first set of delay values, a first uplink resource for transmitting a first acknowledgment feedback associated with the first downlink data transmission, monitor the first downlink shared channel resource for the first downlink data transmission, and transmit, based on the monitoring, the first acknowledgment feedback to the base station via the first uplink resource.

Another apparatus for wireless communication is described. The apparatus may include means for identifying, at a UE, a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station, receiving a first downlink control channel transmission during the first set of downlink control channel monitoring occasions that indicates a first downlink shared channel resource for a first downlink data transmission to the UE, determining, based on the first set of delay values, a first uplink resource for transmitting a first acknowledgment feedback associated with the first downlink data transmission, monitoring the first downlink shared channel resource for the first downlink data transmission, and transmitting, based on the monitoring, the first acknowledgment feedback to the base station via the first uplink resource.

A non-transitory computer-readable medium storing code for wireless communication is described. The code may include instructions executable by a processor to identify, at a UE, a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station, receive a first downlink control channel transmission during the first set of downlink control channel monitoring occasions that indicates a first downlink shared channel resource for a first downlink data transmission to the UE, determine, based on the first set of delay values, a first uplink resource for transmitting a first acknowledgment feedback associated with the first downlink data transmission, monitor the first downlink shared channel resource for the first downlink data transmission, and transmit, based on the monitoring, the first acknowledgment feedback to the base station via the first uplink resource.

Some examples of the method, apparatuses, and non-transitory computer-readable medium described herein may further include operations, features, means, or instructions for receiving a second downlink control channel transmission during the second set of downlink control channel monitoring occasions that indicates a second downlink shared channel resource for a second downlink data transmission to the UE, where the second downlink shared channel resource overlaps with the first downlink shared channel resource, determining, based on the second set of delay values, a second uplink resource for transmitting a second acknowledgment feedback associated with the second downlink data transmission, where the second uplink resource may be different than the first uplink resource, monitoring the second downlink shared channel resource for the second downlink data transmission, and transmitting the second acknowledgment feedback to the base station via the second uplink resource.

In some examples of the method, apparatuses, and non-transitory computer-readable medium described herein, the first set of downlink control channel monitoring occasions correspond to downlink control channel monitoring occasions within an initial number of orthogonal frequency division multiplexing (OFDM) symbols of a slot, and the second set of downlink control channel monitoring occasions correspond to downlink control channel monitoring occasions that may be after the initial number of OFDM symbols of the slot. In some examples of the method, apparatuses, and non-transitory computer-readable medium described herein, the initial number of OFDM symbols corresponds to up to three initial symbols of the slot. In some examples of the method, apparatuses, and non-transitory computer-readable medium described herein, the first uplink resource and the second uplink resource correspond to different feedback bits in a same uplink control channel transmission.

In some examples of the method, apparatuses, and non-transitory computer-readable medium described herein, the first set of delay values may be associated with a first wireless service having a first TTI, and the second set of delay values may be associated with a second wireless service having a second TTI that may be shorter than the first TTI.

In some examples of the method, apparatuses, and non-transitory computer-readable medium described herein, the first wireless service may be associated with downlink shared channel resources that span more than a threshold number of orthogonal frequency division multiplexing (OFDM) symbols, and the second wireless service may be associated with downlink shared channel resources that span a number of OFDM symbols that may be less than or equal to the threshold number of OFDM symbols. In some examples of the method, apparatuses, and non-transitory computer-readable medium described herein, the second wireless service may be associated with downlink shared channel resources that span a number of orthogonal frequency division multiplexing (OFDM) symbols that may be included in an enumerated set of numbers of OFDM symbols, and the first wireless service may be associated with downlink shared channel resources that span numbers of OFDM symbols that may be outside of the enumerated set of numbers of OFDM symbols. In some examples of the method, apparatuses, and non-transitory computer-readable medium described herein, the second wireless service may be associated with downlink control channel monitoring occasions that may be after an initial number of orthogonal frequency division multiplexing (OFDM) symbols of the TTI. In some examples of the method, apparatuses, and non-transitory computer-readable medium described herein, the first wireless service may be associated with downlink shared channel resources that span a more than a threshold number of orthogonal frequency division multiplexing (OFDM) symbols and the second wireless service may be associated with downlink shared channel resources that span a number of OFDM symbols that may be less than or equal to the threshold number of OFDM symbols.

A method of wireless communication is described. The method may include identifying, at a base station, a first set of uplink resources for receiving a first acknowledgment feedback from a UE and a first set of delay values associated with the first set of uplink resources, identifying, at the base station, a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel, transmitting a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation, and monitoring, responsive to the transmitting, the first set of uplink resources for the first acknowledgment feedback from the UE and the second set of uplink resources for the second acknowledgment feedback from the UE.

An apparatus for wireless communication is described. The apparatus may include a processor, memory in electronic communication with the processor, and instructions stored in the memory. The instructions may be executable by the processor to cause the apparatus to identify, at a base station, a first set of uplink resources for receiving a first acknowledgment feedback from a UE and a first set of delay values associated with the first set of uplink resources, identify, at the base station, a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel, transmit a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation, and monitor, responsive to the transmitting, the first set of uplink resources for the first acknowledgment feedback from the UE and the second set of uplink resources for the second acknowledgment feedback from the UE.

Another apparatus for wireless communication is described. The apparatus may include means for identifying, at a base station, a first set of uplink resources for receiving a first acknowledgment feedback from a UE and a first set of delay values associated with the first set of uplink resources, identifying, at the base station, a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel, transmitting a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation, and monitoring, responsive to the transmitting, the first set of uplink resources for the first acknowledgment feedback from the UE and the second set of uplink resources for the second acknowledgment feedback from the UE.

A non-transitory computer-readable medium storing code for wireless communication is described. The code may include instructions executable by a processor to identify, at a base station, a first set of uplink resources for receiving a first acknowledgment feedback from a UE and a first set of delay values associated with the first set of uplink resources, identify, at the base station, a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel, transmit a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation, and monitor, responsive to the transmitting, the first set of uplink resources for the first acknowledgment feedback from the UE and the second set of uplink resources for the second acknowledgment feedback from the UE.

In some examples of the method, apparatuses, and non-transitory computer-readable medium described herein, the first set of delay values may be associated with a first wireless service having a first TTI, and the second set of delay values may be associated with a second wireless service having a second TTI that may be shorter than the first TTI. In some examples of the method, apparatuses, and non-transitory computer-readable medium described herein, the second time domain resource allocation may have a same ending orthogonal frequency division multiplexing (OFDM) symbol as the first time domain resource allocation. In some examples of the method, apparatuses, and non-transitory computer-readable medium described herein, the first set of uplink resources and the second set of uplink resources may be different uplink resources within a same slot.

Some examples of the method, apparatuses, and non-transitory computer-readable medium described herein may further include operations, features, means, or instructions for transmitting, to the UE, configuration information that configures the first set of delay values and the second set of delay values. In some examples of the method, apparatuses, and non-transitory computer-readable medium described herein, the configuration information includes a downlink shared channel time domain resource allocation list that links the first time domain resource allocation with the first set of delay values and that links a second time domain resource allocation of downlink shared channel resources with the second set of delay values.

In some examples of the method, apparatuses, and non-transitory computer-readable medium described herein, the first set of delay values and the second set of delay values may be provided in a downlink data to uplink acknowledgment table that may be provided with the downlink shared channel time domain resource allocation list. In some examples of the method, apparatuses, and non-transitory computer-readable medium described herein, the first set of delay values and the second set of delay values may have same or different units for measuring time domain differences between a downlink data transmission and the first set of uplink resources. In some examples, the units for measuring time domain differences include one or more of slots, sub-slots, orthogonal frequency division multiplexing (OFDM) symbols, or any combinations thereof. In some examples of the method, apparatuses, and non-transitory computer-readable medium described herein, the first set of delay values correspond to downlink shared channel time domain resources that span a first number of orthogonal frequency division multiplexing (OFDM) symbols and the second set of delay values correspond to downlink shared channel time domain resources that span a second number of OFDM symbols. In some examples of the method, apparatuses, and non-transitory computer-readable medium described herein, the first number of OFDM symbols span more than a threshold number of OFDM symbols and the second number of OFDM symbols may be less than or equal to the threshold number of OFDM symbols. In some examples of the method, apparatuses, and non-transitory computer-readable medium described herein, the second number of OFDM symbols may be included in an enumerated set of numbers of OFDM symbols, and the first number of OFDM symbols correspond to other available numbers of OFDM symbols outside of the enumerated set of numbers of OFDM symbols.

In some examples of the method, apparatuses, and non-transitory computer-readable medium described herein, a set of overlapping downlink data transmissions from the base station each end during a same transmission time interval, and the first acknowledgment feedback may be associated with latest starting data transmission of the set of overlapping downlink data transmissions. In some examples of the method, apparatuses, and non-transitory computer-readable medium described herein, a set of overlapping downlink data transmissions from the base station each end during a same transmission time interval, and the first acknowledgment feedback may be associated with a data transmission of the set of overlapping downlink data transmissions that may have a shortest time duration.

A method of wireless communication is described. The method may include identifying, at a base station, a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE, transmitting a first downlink control channel transmission during the first set of UE downlink control channel monitoring occasions that indicates a first downlink shared channel resource for a first downlink data transmission to the UE, transmitting the first downlink data transmission to the UE via the first downlink shared channel resource, determining, based on the first set of delay values, a first uplink resource for receiving a first acknowledgment feedback associated with the first downlink data transmission, and monitoring the first uplink resource for the first acknowledgment feedback.

An apparatus for wireless communication is described. The apparatus may include a processor, memory in electronic communication with the processor, and instructions stored in the memory. The instructions may be executable by the processor to cause the apparatus to identify, at a base station, a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE, transmit a first downlink control channel transmission during the first set of UE downlink control channel monitoring occasions that indicates a first downlink shared channel resource for a first downlink data transmission to the UE, transmit the first downlink data transmission to the UE via the first downlink shared channel resource, determine, based on the first set of delay values, a first uplink resource for receiving a first acknowledgment feedback associated with the first downlink data transmission, and monitor the first uplink resource for the first acknowledgment feedback.

Another apparatus for wireless communication is described. The apparatus may include means for identifying, at a base station, a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE, transmitting a first downlink control channel transmission during the first set of UE downlink control channel monitoring occasions that indicates a first downlink shared channel resource for a first downlink data transmission to the UE, transmitting the first downlink data transmission to the UE via the first downlink shared channel resource, determining, based on the first set of delay values, a first uplink resource for receiving a first acknowledgment feedback associated with the first downlink data transmission, and monitoring the first uplink resource for the first acknowledgment feedback.

A non-transitory computer-readable medium storing code for wireless communication is described. The code may include instructions executable by a processor to identify, at a base station, a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE, transmit a first downlink control channel transmission during the first set of UE downlink control channel monitoring occasions that indicates a first downlink shared channel resource for a first downlink data transmission to the UE, transmit the first downlink data transmission to the UE via the first downlink shared channel resource, determine, based on the first set of delay values, a first uplink resource for receiving a first acknowledgment feedback associated with the first downlink data transmission, and monitor the first uplink resource for the first acknowledgment feedback.

Some examples of the method, apparatuses, and non-transitory computer-readable medium described herein may further include operations, features, means, or instructions for transmitting a second downlink control channel transmission during the second set of downlink control channel monitoring occasions that indicates a second downlink shared channel resource for a second downlink data transmission to the UE, where the second downlink shared channel resource overlaps with the first downlink shared channel resource, determining, based on the second set of delay values, a second uplink resource for receiving a second acknowledgment feedback associated with the second downlink data transmission, where the second uplink resource may be different than the first uplink resource, transmitting the second downlink data transmission to the UE via the second downlink shared channel resource, and monitoring the second uplink resource for the second acknowledgment feedback.

In some examples of the method, apparatuses, and non-transitory computer-readable medium described herein, the first set of downlink control channel monitoring occasions correspond to downlink control channel monitoring occasions within an initial number of orthogonal frequency division multiplexing (OFDM) symbols of a slot, and the second set of downlink control channel monitoring occasions correspond to downlink control channel monitoring occasions that may be after the initial number of OFDM symbols of the slot. In some examples of the method, apparatuses, and non-transitory computer-readable medium described herein, the initial number of OFDM symbols corresponds to up to three initial OFDM symbols of the slot.

In some examples of the method, apparatuses, and non-transitory computer-readable medium described herein, the first uplink resource and the second uplink resource correspond to different feedback bits in a same uplink control channel transmission. In some examples of the method, apparatuses, and non-transitory computer-readable medium described herein, the first set of delay values may be associated with a first wireless service having a first TTI, and the second set of delay values may be associated with a second wireless service having a second TTI that may be shorter than the first TTI. In some examples of the method, apparatuses, and non-transitory computer-readable medium described herein, the first wireless service may be associated with downlink shared channel resources that span more than a threshold number of orthogonal frequency division multiplexing (OFDM) symbols, and the second wireless service may be associated with downlink shared channel resources that span a number of OFDM symbols that may be less than or equal to the threshold number of OFDM symbols. In some examples of the method, apparatuses, and non-transitory computer-readable medium described herein, the second wireless service may be associated with downlink shared channel resources that span a number of orthogonal frequency division multiplexing (OFDM) symbols that may be included in an enumerated set of numbers of OFDM symbols, and the first wireless service may be associated with downlink shared channel resources that span numbers of OFDM symbols that may be outside of the enumerated set of numbers of OFDM symbols.

In some examples of the method, apparatuses, and non-transitory computer-readable medium described herein, the second wireless service may be associated with downlink control channel monitoring occasions that may be after an initial number of orthogonal frequency division multiplexing (OFDM) symbols of the TTI. In some examples of the method, apparatuses, and non-transitory computer-readable medium described herein, the first wireless service may be associated with downlink shared channel resources that span a more than a threshold number of orthogonal frequency division multiplexing (OFDM) symbols and the second wireless service may be associated with downlink shared channel resources that span a number of OFDM symbols that may be less than or equal to the threshold number of OFDM symbols.

BRIEF DESCRIPTION OF THE DRAWINGS

FIG. 4 illustrates an example of a resource allocation and delay value list that supports acknowledgment feedback techniques in wireless communications in accordance with aspects of the present disclosure.

DETAILED DESCRIPTION

Figure 1:
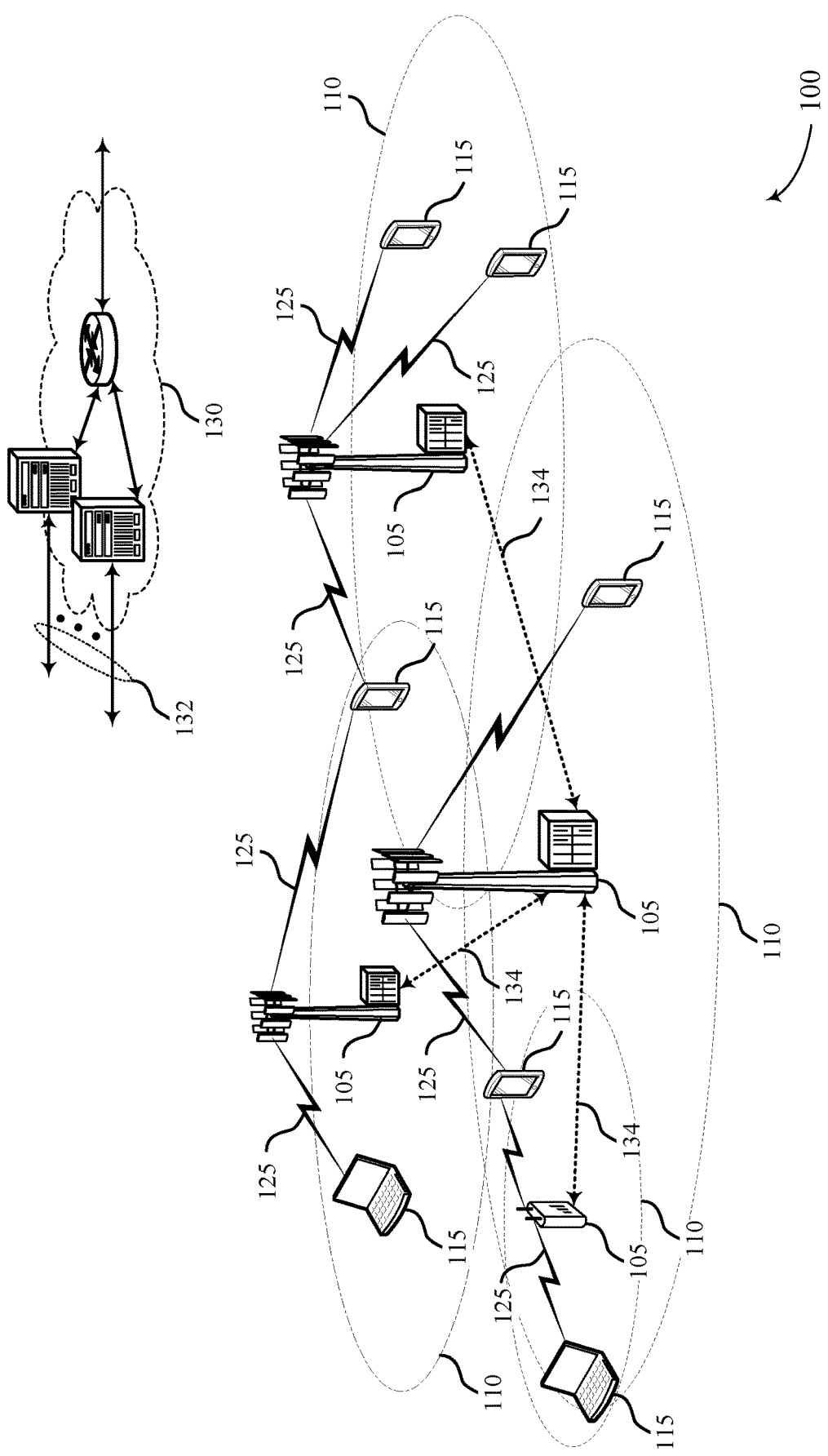
FIG. 1 illustrates an example of a system for wireless communications that supports acknowledgment feedback techniques in wireless communications in accordance with aspects of the present disclosure.

Various aspects of the present disclosure provide techniques provide for unambiguous mapping between downlink control channel transmissions, downlink shared channel transmissions, and uplink acknowledgment feedback resources. In some cases, codebook-based acknowledgment resources may be configured for transmission of uplink acknowledgment feedback from a user equipment (UE), and feedback delay values may be associated with time domain resources of the downlink shared channel transmissions. Such delay values may include, for example, $K_1$ delay values that indicate a number of slots or sub-slots between a downlink shared channel transmission and an associated uplink acknowledgment feedback. In cases where multiple acknowledgment feedback transmissions are provided in a same slot, techniques such as described herein may allow for unambiguous association between the feedback and the corresponding downlink shared channel transmission.

In some cases different wireless services, such as services that use ultra-reliable low latency communications (URLLC) or services that use enhanced mobile broadband (eMBB), may have acknowledgment feedback (e.g., hybrid acknowledgment repeat request (HARQ) acknowledgment/negative-acknowledgment (ACK/NACK) feedback) that is transmitted during a same slot. The delay values associated with the time domain resources of the different wireless services may be non-overlapping such that different services may have corresponding acknowledgment resources when using semi-static codebook determination of feedback resources. While various examples discussed herein discuss different wireless services, it is noted that techniques provided herein may also be applied to wireless communications of only a single service (e.g., URLLC only communications, eMBB only communications, or combinations thereof).

In some aspects, feedback delay values may be associated with particular search spaces or monitoring occasions of the downlink control channel transmissions of resource allocations for the downlink shared channel transmissions. In such cases, particular monitoring occasions or search spaces may be associated with same or different wireless services, and may have associated semi-static codebook-based uplink control channel resources for transmitting acknowledgment feedback. Based on the different delay values configured for the different monitoring occasions or search spaces, the uplink control channel resources may be unambiguously associated with a particular monitoring occasion or search space.

In some examples, to support processing of the acknowledgment feedback messages, the UE may transmit an indication of one or more UE capabilities to the serving base station. A UE capability may indicate, for example, that the UE is capable of associating different delay values to different time domain shared channel resources, or different search spaces or monitoring occasions. The base station may use the received UE capabilities to schedule communications (e.g., via radio resource control (RRC) signaling that indicates delay values and associated time domain resources, control message transmissions, data transmissions, allocated acknowledgment resources, etc.) for the UE.

Aspects of the disclosure are initially described in the context of a wireless communications system. Additional aspects of the disclosure are described with reference to communication timelines and process flows. Aspects of the disclosure are further illustrated by and described with reference to apparatus diagrams, system diagrams, and flowcharts that relate to acknowledgment feedback techniques in wireless communications.

FIG. 1 illustrates an example of a wireless communications system 100 that supports acknowledgment feedback techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. In other cases, HARQ feedback for two or more downlink transmissions may be provided in a same uplink slot or TTI.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, UEs 115 and base stations 105 may use semi-static codebook acknowledgment resources for transmission of uplink acknowledgment feedback from a UE 115 to a base station 105. In some cases, feedback delay values (e.g., $K_1$ delay values) may be associated with time domain resources of the downlink shared channel (e.g., PDSCH) transmissions. Additionally or alternatively, feedback delay values may be associated with particular search spaces or monitoring occasions of the downlink control channel (e.g., PDCCH) transmissions that include resource allocations for the downlink shared channel transmissions (e.g., downlink control information (DCI)). A UE 115 using codebook-based acknowledgment feedback resources may thus unambiguously identify uplink resources that are to be used for transmitting the uplink acknowledgment feedback.

Figure 2:
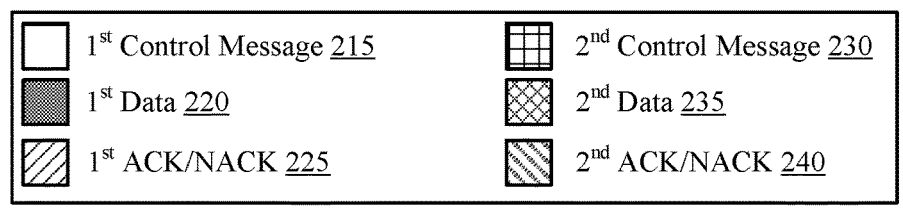
FIG. 2 illustrates an example of a portion of a wireless communications system that supports acknowledgment feedback techniques in wireless communications in accordance with aspects of the present disclosure.
Figure 2:
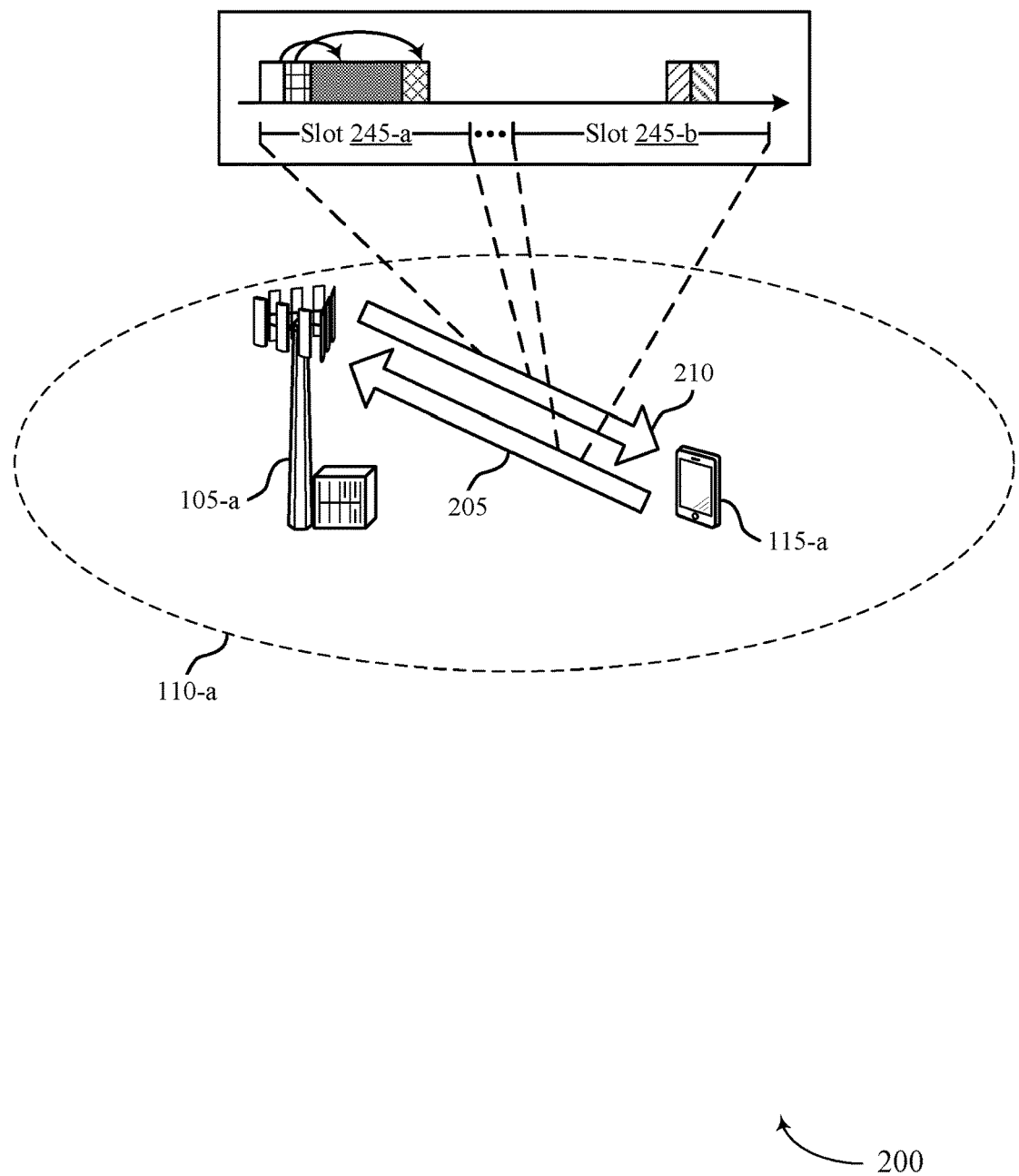

FIG. 2 illustrates an example of a wireless communications system 200 that supports acknowledgment feedback techniques in wireless communications in accordance with aspects of the present disclosure. In some examples, wireless communications system 200 may implement aspects of wireless communications system 100. The wireless communications system 200 may include base station 105-a and UE 115-a, which may be examples of the corresponding devices described with reference to FIG. 1. Base station 105-a may provide network coverage for a geographic coverage area 110-a. The base station 105-a may transmit downlink transmissions 210 to the UE 115-a, and the UE 115-a may transmit uplink communications 205 to the base station 105-a.

In some cases, the wireless communications system 200 (e.g., an NR system) may support acknowledgment feedback in which uplink resources for transmitting the acknowledgment feedback are determined based on a semi-static codebook that is configured by the base station 105-a. In some examples, the base station 105-a may configure the semi-static codebook via RRC signaling to the UE 115-a. In such cases, the base station 105-a may transmit a first control message 215, such as a DCI transmission, that indicates allocated resources for a first data transmission 220 (e.g., a PDSCH transmission). Based on the semi-static codebook, the UE 115-a and the base station 105-a may determine uplink resources of a subsequent slot 245-b that are to be used for a first ACK/NACK 225 transmission from the UE 115-a to the base station 105-a. Further, in this example, the base station 105-a may transmit a second control message 230 (e.g., a DCI transmission via PDCCH), that indicates allocated resources for a second data transmission 235 (e.g., a PDSCH transmission). Based on the semi-static codebook, the UE 115-a and the base station 105-a may determine uplink resources of the subsequent slot 245-b that are to be used for a second ACK/NACK 240 transmission from the UE 115-a to the base station 105-a.

In this example, both the first data transmission 220 and the second data transmission 235 are transmitted in a same slot 245-a, although in other cases the different data transmissions may be transmitted in different slots. Further, in this example, both the first control message 215 and the second control message 230 are also transmitted in the first slot 245-a, although in other cases such control messages may be transmitted in different slots. Further, in some cases, one or more data transmissions may be scheduled through semi-persistent scheduling. In the example of FIG. 2, the first data transmission 220 may be an eMBB transmission, and the second data transmission 235 may be a URLLC transmission.

In accordance with techniques discussed herein, the base station 105-a may, in some cases, configure the first ACK/NACK 225 resources and the second ACK/NACK 240 resources such that they are unambiguously associated with the respective first data transmission 220 and the second data transmission 235. Such techniques may allow for identification of the ACK/NACK resources correctly irrespective of whether the UE 115-a fails to receive one of the first control message 215 or the second control message 230. In some existing systems, a semi-static codebook configuration may provide that uplink resources for acknowledgment feedback are determined based on delay values that are not associated with any particular downlink time domain resources. In the event that the UE 115-a does not successfully receive and decode a downlink control message (e.g., first control message 215 or second control message 230), and transmits only one of the ACK/NACK messages, there would thus be ambiguity as to which data transmission is associated with the ACK/NACK message. By associating a particular time domain resource for data transmissions to an uplink ACK/NACK resource, such ambiguity may be avoided. In other cases where control channel search spaces or monitoring occasions are associated with different ACK/NACK resources, such ambiguity may also be removed.

In some examples, to support control processing of the control messages 215 and 230, the data transmissions 220 and 235, and ACK/NACKs 225 and 240, UE 115-a may transmit an indication of one or more UE capabilities via the uplink communications 205 to base station 105-a. A UE capability may indicate a maximum number of TTIs that the UE 115-a can buffer, a data processing capability of the UE 115-a, or a combination of these or other capabilities associated with control messages and/or data processing. Base station 105-a may use the received UE capabilities to configure a semi-static codebook as described herein, and schedule transmissions (e.g., control message transmissions, data transmissions, or both) for UE 115-a.

In some cases, the delay values configured for the UE 115-a to use in identifying uplink ACK/NACK resources, may be different based on different services (e.g., URLLC and eMBB). For example, eMBB may be configured with a first set of delay values (e.g., a first set of $K_1$ values), and URLLC may be configured with a second set of delay values (e.g., a second set of $K_1$ values). In some cases, different time units may apply to the different sets of delay values. For example, the $K_1$ unit for eMBB may be at a slot level, and the $K_1$ unit for URLLC it can be shorter time unit, such as a sub-slot or mini slot (e.g., 2 OFDM symbols, 3 OFDM symbols, or 7 OFDM symbols). In cases where more than one acknowledgment feedback transmissions are provided in same slot or TTI, latency may be improved, reliability may be improved, or both, where URLLC and eMBB may be multiplexed into different PUCCH resources (e.g., using different $K_1$ HARQ ACK/NACK timing values).

Figure 3:
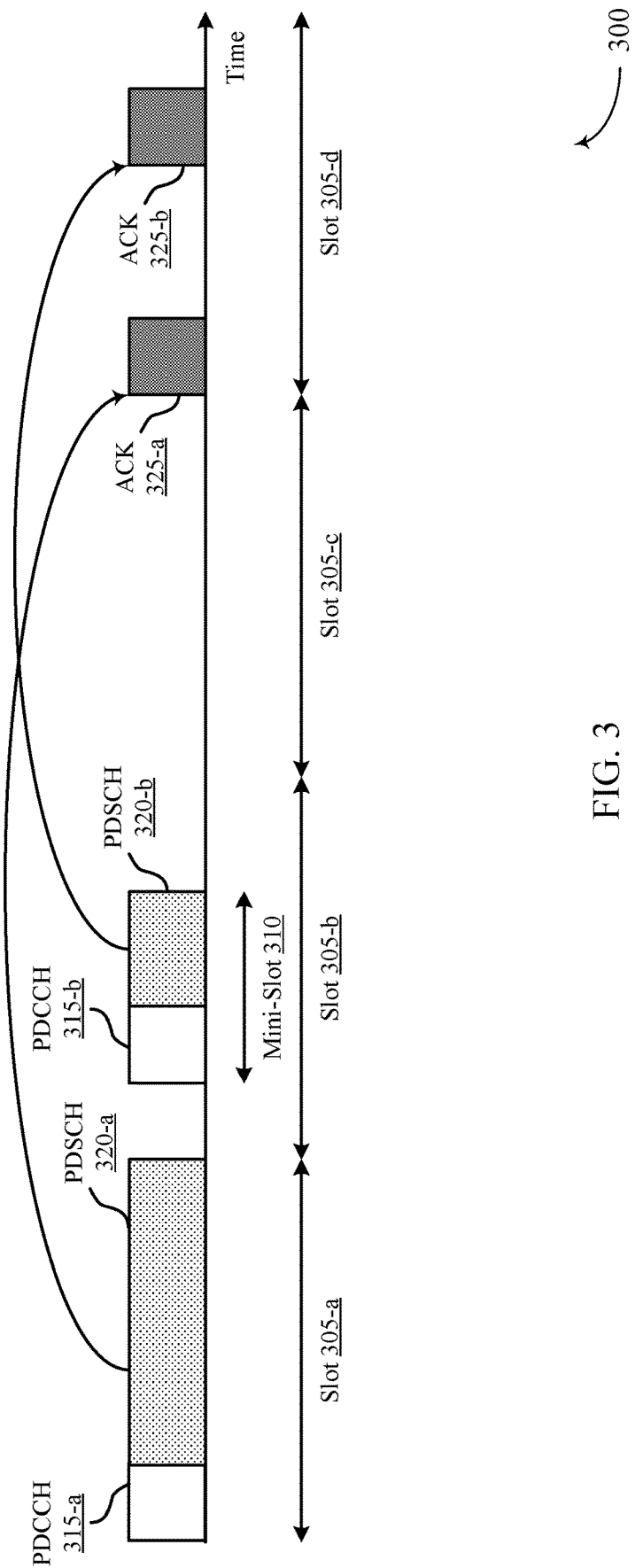
FIG. 3 illustrates an example of a communications timeline that supports acknowledgment feedback techniques in wireless communications in accordance with aspects of the present disclosure.

FIG. 3 illustrates an example of a communications timeline 300 that supports acknowledgment feedback techniques in wireless communications in accordance with aspects of the present disclosure. The communications timeline 300 may illustrate timing of communications between a base station 105 and a UE 115, which may be examples of the devices described with reference to FIGS. 1 and 2. The communications timeline 300 may be organized into slots 305, mini-slots 310, or both. For example, a slot 305 may correspond to a TTI for enhanced Mobile Broadband (eMBB) communications while a mini-slot 310 may correspond to a TTI for URLLC communications. For example, a base station 105 implementing eMBB may transmit a first PDCCH message 315-a and a first PDSCH transmission 320-a in a first slot 305-a. In this example, a second slot 305-b may include a mini-slot 310 and the base station 105 implementing URLLC may transmit a second PDCCH message 315-b and a second PDSCH transmission 320-b in the mini-slot 310 (which may also be referred to as a sub-slot or a shortened TTI (sTTI)).

In some cases, a UE 115 may receive the multiple PDCCH messages 315, identify the resources allocated for the corresponding PDSCH transmissions 320, and receive and decode the PDSCH transmissions 320. For example, each PDCCH message 315 may include a value, $K_0$, indicating a number of TTIs (e.g., slots 305, mini-slots 310, symbols, etc.) between the PDCCH message 315 and the corresponding PDSCH transmission 320. In some cases, when using semi-static codebook based PUCCH resources for acknowledgment feedback, the UE and base station may associate the time domain resource allocation for PDSCH to $K_1$ values for acknowledgment feedback timing. In such cases, based on the time domain resources of the first PDSCH transmission 320-a, the UE and base station may identify a first set of uplink control channel resources for a first ACK 325-a, and based on the time domain resources of the second PDSCH transmission 320-b, the UE and base station may identify a second set of uplink control channel resources for a second ACK 325-b.

In some cases, the time domain resources for the PDSCH transmissions 320 may be provided in a time domain resource allocation list (e.g., a PDSCH-TimeDomainResourceAllocationList in NR). Further, the delay values (e.g., $K_1$ delay values) may be provided with the time domain resource allocation list, which may allow the UE and base station to identify uplink control channel resources for ACKs 325 that are associated with a corresponding PDSCH transmission 320. An example of such a time domain resource allocation list with associated delay values is illustrated in FIG. 4.

FIG. 4 illustrates an example of a resource allocation and delay value list 400 that supports acknowledgment feedback techniques in wireless communications in accordance with aspects of the present disclosure. In some examples, resource allocation and delay value list 400 may implement aspects of wireless communications system 100 or 200. In this example, resource allocation and delay value list 400 includes a number of rows (e.g., up to 16 rows) that each provide time domain resource allocations and delay values for a semi-static codebook.

In the example, of FIG. 4, a first column may be a row index 405 column, a second column may indicate a value for $K_0$ (i.e., a number of slots, mini-slots, etc., between a PDCCH and associated PDSCH transmission), a third column may provide a DMRS mapping type 415, a fourth column may provide a start and length indicator value (SLIV) 420, and a fifth column may provide a set of values between downlink data to uplink acknowledgment 425. In some cases, the resource allocation and delay value list 400 may be generated using the PDSCH-TimeDomainResourceAllocationList in NR, and adding dl-DataToUL-ACK tables such that the $K_1$ delay values are associated with particular PDSCH time domain resources. In some cases, the unit of different sets for $K_1$ can be the same or different (e.g. URLLC sub-slot and eMBB slot). In the example of FIG. 4, two sets of $K_1$ values are defined, namely one for URLLC and one for eMBB. It is noted that this example is provided for purposes of illustration and discussion only, and more and/or different sets of $K_1$ values can be configured in other examples.

In this example, row i represents a URLLC mini-slot of length 2 (i.e., two OFDM symbols), and row j represents an eMBB assignment. In this case, although the ending symbols for these two occasions of candidate PDSCH receptions belong to a same slot or sub-slot, the corresponding $K_1$ values do not overlap, and thus the associated acknowledgment feedback will be reported into different PUCCH resources. In other cases, two sets of $K_1$ values may be introduced (e.g., one for URLLC and another for eMBB). The two sets of $K_1$ values allows the acknowledgment feedback transmission to be mapped into different PUCCH resources. In one example, if the length of candidate PDSCH reception is more than a threshold value, L (e.g., L=7), the PDSCH will be considered as eMBB, and if the length of the candidate PDSCH reception is less than or equal to L the PDSCH will be considered as URLLC. In another example, if the candidate PDSCH is of length $\{2, 4, 7\}$ it is considered URLLC, and otherwise it is considered to be eMBB.

Such techniques enable eMBB and URLLC PDSCH transmissions to be encoded in different codebooks, and mapped into different PUCCH resources, with semi-static codebook determination. For example, a UE may determine semi-static codebook at slot (or sub-slot) "n", for the configured set of $K_1$ HARQ timing values. In this example, the UE may be configured to monitor PDCCH for DCI format 1_1. In the last DCI referring to PUCCH resource in slot "n", the set of $K_1$ values is given by $\{0, 1, 3, 5, 7, 9, 11, 15\}$, as indicated in FIG. 4. In this case, the UE may go back to each of the slots (or sub-slots) given in the set of $K_1$ (i.e., k=0, 1, 3, etc.). At slot (or sub-slot) n-k, the UE may identify, using PDSCH-TimeDomainResourceAllocationList all possible time-domain resource allocations for PDSCH that end at slot n-k. Based on the set of values between downlink data to uplink acknowledgment 425, the PDSCH ending at slot n-k is considered as a candidate reception only once the value k exists in the list of $K_1$ values for this candidate. Thus, by selecting the delay values of different services to be non-overlapping, the PUCCH resource for acknowledgment feedback transmissions of the different services may be mapped to different resources. Thus, acknowledgment feedback transmissions may be unambiguously associated with PDSCH transmissions. Further, such techniques may potentially decrease size of semi-static codebook, where not all PDSCH candidates ending at slot n-k are considered in codebook determination, which may reduce complexity at the UE.

Additionally, such techniques may allow for reception of more than one PDSCH in a same slot for occasions of candidate PDSCH receptions that overlap in time. Such techniques may also allow for acknowledgment feedback in cases where intra UE pre-emption is adopted, as the overlapping PDSCH transmissions do not have common $K_1$ values.

In other cases, other techniques may be employed for semi-static codebook once different candidate PDSCH receptions overlap in time, such as, among all overlapping candidate PDSCH receptions that end at sub-slot "n", reporting ACK/NACK only for the one that starts latest. Such a technique provides an acknowledgment feedback for what is likely a higher priority transmission (e.g., URLLC) that starts at a latest time, and in some cases the starting symbol can be in another sub-slot or slot. Another technique that may be employed may provide that among all overlapping candidate PDSCH receptions that end at sub-slot "n", report only ACK/NACK only for the one that has the minimum length (e.g., URLLC). In still further cases, overlapping transmissions may be considered to be an error case and the UE may drop all overlapping candidate PDSCH receptions, and not report ACK/NACK for overlapping candidate PDSCH receptions. In still further techniques, downlink control channel search spaces or monitoring occasions may be associated with different delay values, such as discussed with respect to FIG. 5.

Figure 5:
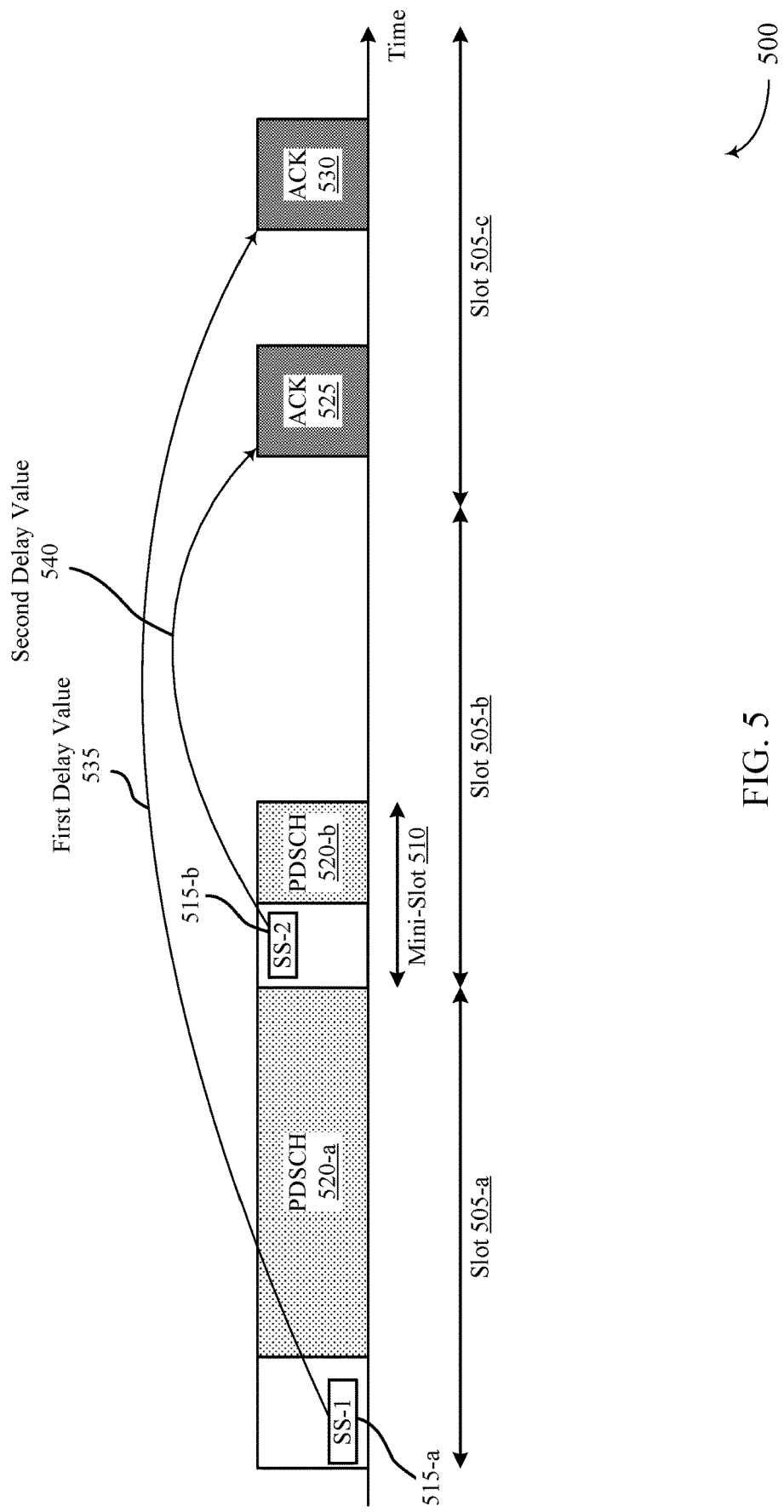
FIG. 5 illustrates an example of a communications timeline that supports acknowledgment feedback techniques in wireless communications in accordance with aspects of the present disclosure.

FIG. 5 illustrates an example of a communications timeline 500 that supports acknowledgment feedback techniques in wireless communications in accordance with aspects of the present disclosure. The communications timeline 500 may illustrate timing of communications between a base station 105 and a UE 115, which may be examples of the devices described with reference to FIGS. 1 and 2. The communications timeline 500 may be organized into slots 505, mini-slots 510, or both. For example, a slot 505 may correspond to a TTI for enhanced Mobile Broadband (eMBB) communications while a mini-slot 510 may correspond to a TTI for URLLC communications.

In some cases, the base station may configure the UE with one or more search spaces and/or monitoring occasions, which indicate PDCCH resources that may include a resource assignment for the UE. For example, a base station implementing eMBB may transmit a first PDCCH message in a first search space 515-a and a first PDSCH transmission 520-a in a first slot 505-a. In this example, a second slot 505-b may include a mini-slot 510 and the base station implementing URLLC may transmit a second PDCCH message in a second search space 515-b and a second PDSCH transmission 520-b in the mini-slot 510 (which may also be referred to as a sub-slot or a shortened TTI (sTTI)).

In some cases, the UE may receive the multiple PDCCH messages when monitoring the search spaces 515 (e.g., during a monitoring opportunity), identify the resources allocated for the corresponding PDSCH transmissions 520, and receive and decode the PDSCH transmissions 520, similarly as discussed with respect to FIG. 3. In some cases, when using semi-static codebook based PUCCH resources for acknowledgment feedback, the UE and base station may associate the search spaces 515 and/or monitoring occasion of the PDCCH transmissions to $K_1$ values for acknowledgment feedback timing. For example, the first search space 515-a may have a first delay value 535 that indicates a delay between the first PDSCH transmission 520-a and a first acknowledgment 525 transmission, and the second search space 515-b a may have a second delay value 540 that indicates a delay between the second PDSCH transmission 520-b and a second acknowledgment 530 transmission.

In such cases, for a candidate PDSCH reception, the UE also considers its corresponding PDCCH monitoring occasion or search space. In some cases, if the PDCCH monitoring is within a first number of symbols at the beginning of the slot 505 (e.g., if the PDCCH monitoring belongs to up to three symbols at the beginning of the slot 505), then the UE may report acknowledgment feedback based on one or more rules. Such rules may include, for example, that the UE may report separate ACK/NACK bits in the PUCCH transmission for each PDSCH candidate associated with a set of delay values (e.g., $K_1$ values that are configured for the PUCCH transmission based on the monitoring occasion or search space. In other examples, the rules may provide that if the length of the PDSCH candidate is more than a threshold value (L), the PDSCH is assumed to be for a first wireless service (e.g., eMBB), and if the length of the PDSCH candidate is equal to or less than the threshold value, the PDSCH is assumed to be for a second wireless service (e.g., URLLC). The threshold value (L) may be, for example, seven OFDM symbols. In still further examples, the rules may provide that if the candidate PDSCH is of a certain length (e.g., 2, 4, or 7 OFDM symbols) the PDSCH is considered to be for the second wireless service (e.g., URLLC) and otherwise the PDSCH is considered to be for the first wireless service (e.g., eMBB). In some cases, if the PDCCH is after the first number of symbols at the beginning of the slot 505, then the UE may report acknowledgment feedback assuming that the PDSCH is for the second wireless service (e.g., URLLC). In other cases, if the PDCCH is after the first number of symbols at the beginning of the slot 505, then the UE may report acknowledgment feedback based on a length of the PDSCH (e.g., relative to a threshold value (L)).

Figure 6:
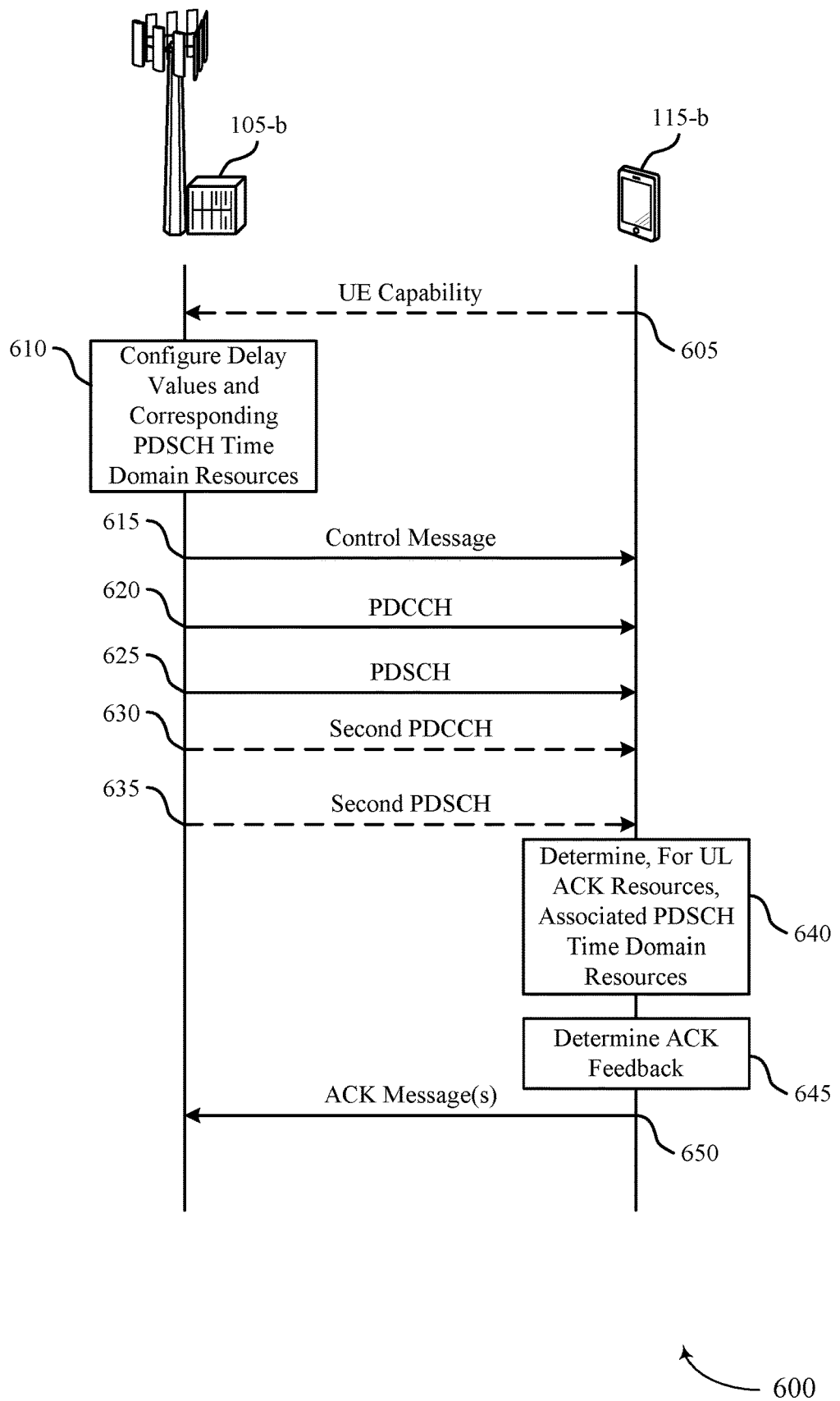
FIGS. 6 and 7 illustrate examples of process flows that support acknowledgment feedback techniques in wireless communications in accordance with aspects of the present disclosure.

FIG. 6 illustrates an example of a process flow 600 that supports acknowledgment feedback techniques in wireless communications in accordance with aspects of the present disclosure. The process flow 600 may include base station 105-b and UE 115-b, which may be examples of the corresponding devices described with reference to FIGS. 1 through 5. Base station 105-b and UE 115-b may implement one or more techniques for acknowledgment feedback as discussed herein. Alternative examples of the following may be implemented, where some steps are performed in a different order than described or are not performed at all. In some cases, steps may include additional features not mentioned below, or further steps may be added.

Optionally, at 605, UE 115-b may transmit, to base station 105-b, a capability of the UE 115-b. In some cases, the capability of the UE 115-b may be an indication of acknowledgment capabilities of the UE 115-b. In other cases, the capability of the UE 115-b may indicate a data processing capability of the UE 115-b. For example, the data processing capability of the UE 115-b may indicate a minimum number of TTIs that the UE uses for data processing prior to transmitting an acknowledgment message.

At 610, base station 105-b may configure delay values and corresponding PDSCH time resources. In some cases, the base station 105-b may configure a list such as illustrated in FIG. 4, that may indicate semi-static codebook information for acknowledgment feedback.

At 615, base station 105-b may transmit a control message to UE 115-b. The control message may be transmitted, for example, via RRC signaling and may indicate the semi-static codebook information for use in transmitting acknowledgment feedback.

At 620, base station 105-b may transmit a PDCCH message to UE 115-b. The PDCCH message may include an indication of resources that are allocated for a first PDSCH transmission. At 625, the base station 105-b may transmit the PDSCH transmission to the UE 115-b. In some cases, the base station 105-b may optionally, at 630, transmit a second PDCCH message and, at 635, a second PDSCH transmission to the UE 115-b. In some cases, each of the first and second PDSCH messages may overlap within a TTI or have a common ending symbol within the TTI.

At 640, UE 115-b may determine PUCCH resources for a feedback acknowledgment, and associated PDSCH time domain resources associated with the uplink feedback acknowledgment resources. In some cases, the UE 115-b may determine the associated PDSCH time domain resources based on a set of delay values provided in the semi-static codebook that was configured by the base station 105-b, in a manner similar as discussed with respect to FIGS. 3 and 4.

At 645, the UE 115-b may determine acknowledgment feedback to be provided to the base station 105-b. Such acknowledgment feedback may be HARQ ACK/NACK feedback that is determined based on whether the UE 115-b successfully received and decoded one or more of the PDSCH transmissions. At 650, UE 115-b may transmit one or more acknowledgment messages in the allocated acknowledgment resources for the received data.

Figure 7:
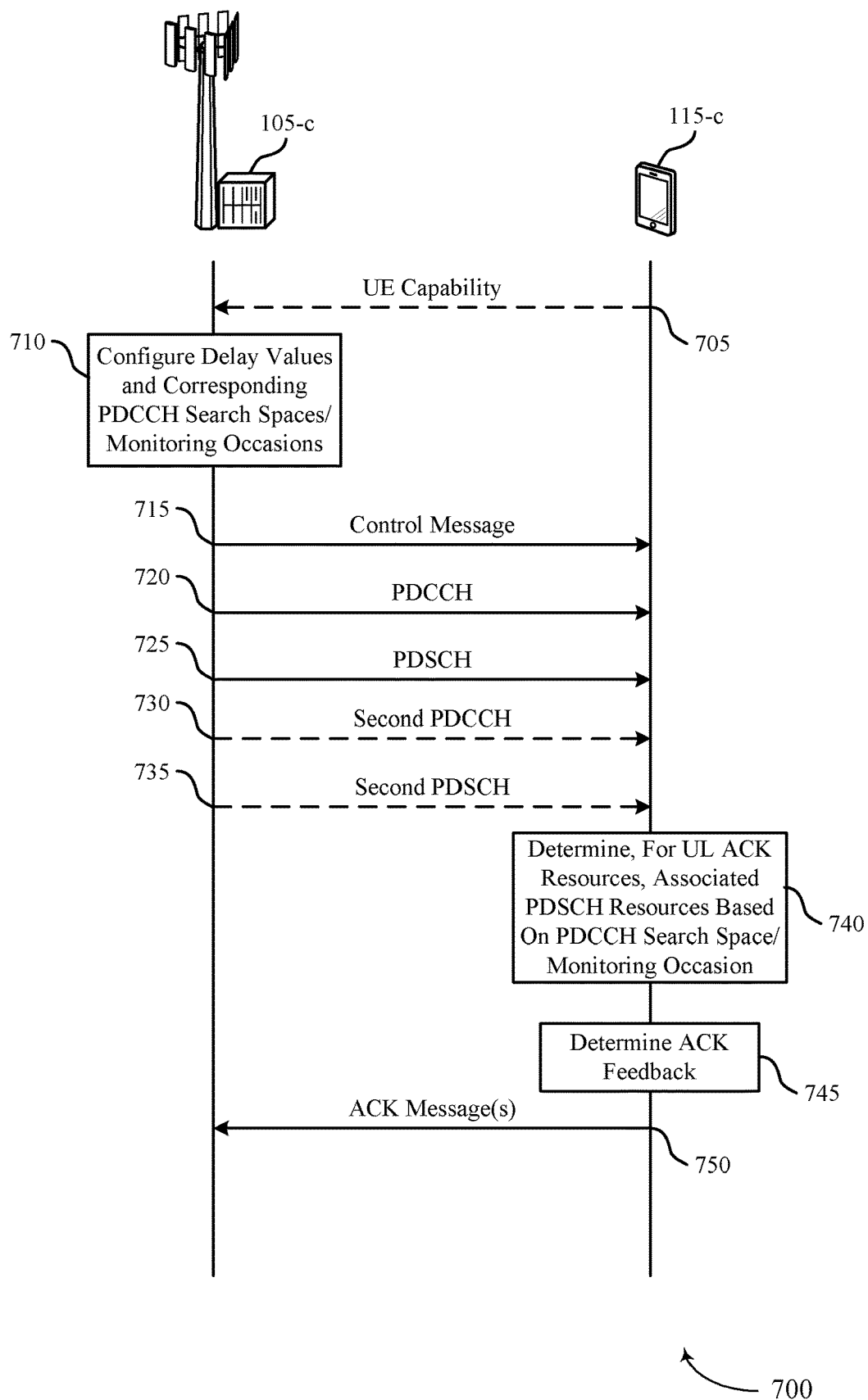

FIG. 7 illustrates an example of a process flow 700 that supports acknowledgment feedback techniques in wireless communications in accordance with aspects of the present disclosure. The process flow 700 may include base station 105-c and UE 115-c, which may be examples of the corresponding devices described with reference to FIGS. 1 through 6. Base station 105-c and UE 115-c may implement one or more techniques for acknowledgment feedback as discussed herein. Alternative examples of the following may be implemented, where some steps are performed in a different order than described or are not performed at all. In some cases, steps may include additional features not mentioned below, or further steps may be added.

Optionally, at 705, UE 115-c may transmit, to base station 105-c, a capability of the UE 115-c. In some cases, the capability of the UE 115-c may be an indication of acknowledgment capabilities of the UE 115-c. In other cases, the capability of the UE 115-c may indicate a data processing capability of the UE 115-c. For example, the data processing capability of the UE 115-c may indicate a minimum number of TTIs that the UE uses for data processing prior to transmitting an acknowledgment message.

At 710, base station 105-c may configure delay values and corresponding PDCCH search spaces and/or monitoring occasions. In some cases, the base station 105-c may configure a set of non-overlapping delay values that are associated with different search spaces/monitoring occasions, in a manner similarly as discussed with respect to FIG. 5.

At 715, base station 105-c may transmit a control message to UE 115-c. The control message may be transmitted, for example, via RRC signaling and may indicate the configured search spaces and monitoring occasions, and the set of delay values that are associated with each configured search space/monitoring occasion.

At 720, base station 105-c may transmit a PDCCH message to UE 115-c. The PDCCH message may include an indication of resources that are allocated for a first PDSCH transmission. At 725, the base station 105-c may transmit the first PDSCH transmission to the UE 115-c. In some cases, the base station 105-c may optionally, at 730, transmit a second PDCCH message and, at 735, a second PDSCH transmission to the UE 115-c. In some cases, each of the first and second PDSCH messages may overlap within a TTI or have a common ending symbol within the TTI.

At 740, UE 115-c may determine PUCCH resources for a feedback acknowledgment, and associated PDSCH transmissions associated with the uplink feedback acknowledgment resources. In some cases, the UE 115-c may determine the associated PDSCH resources based on a set of delay values that are configured for the PDCCH search space or monitoring occasion that included the PDCCH message corresponding to the PDSCH, in a manner similar as discussed with respect to FIG. 5.

At 745, the UE 115-c may determine acknowledgment feedback to be provided to the base station 105-c. Such acknowledgment feedback may be HARQ ACK/NACK feedback that is determined based on whether the UE 115-c successfully received and decoded one or more of the PDSCH transmissions. At 750, UE 115-c may transmit one or more acknowledgment messages in the allocated acknowledgment resources for the received data.

Figure 8:
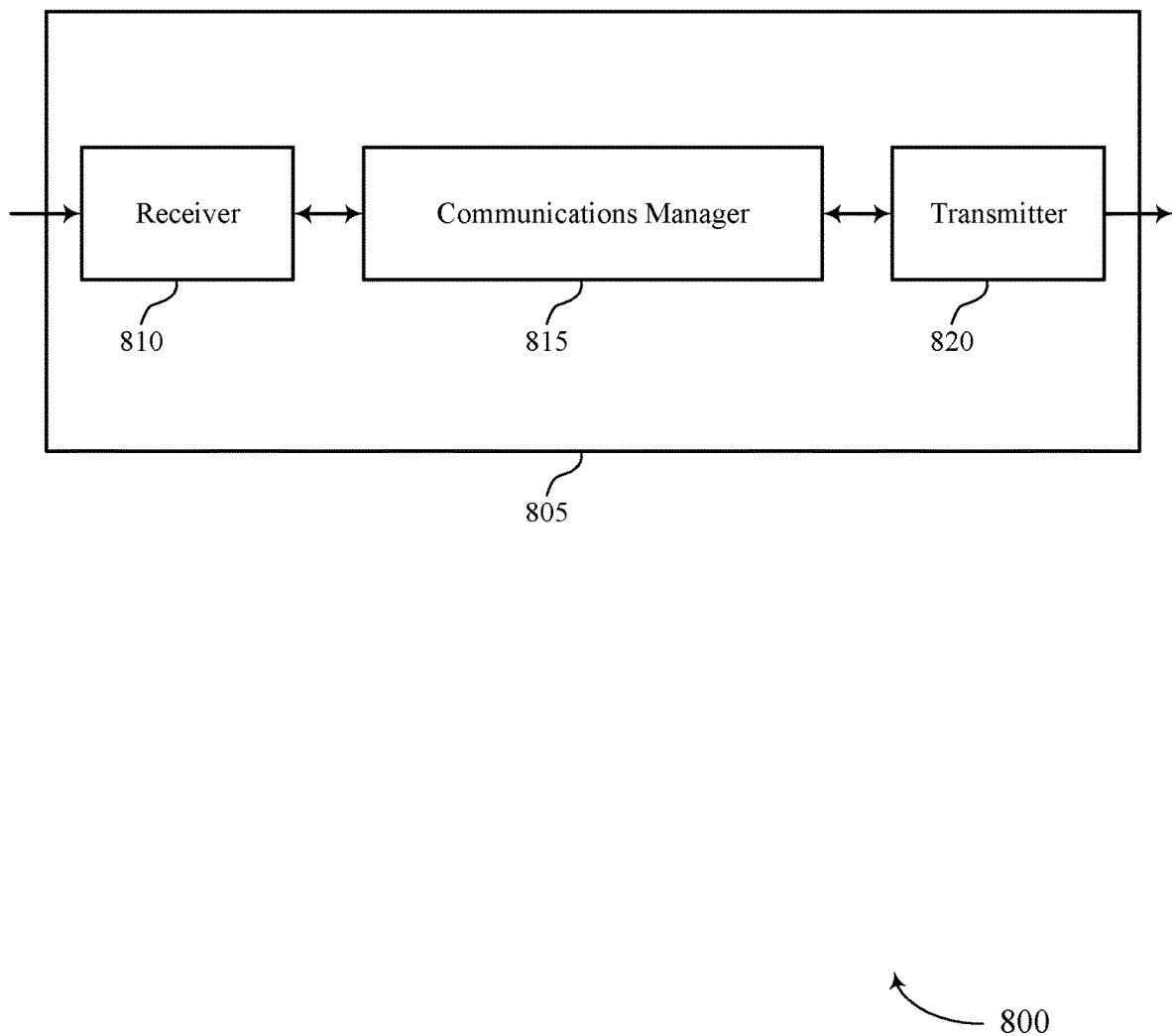
FIGS. 8 and 9 show block diagrams of devices that support acknowledgment feedback techniques in wireless communications in accordance with aspects of the present disclosure.

FIG. 8 shows a block diagram 800 of a device 805 that supports acknowledgment feedback techniques in wireless communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to acknowledgment feedback techniques in wireless communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel, determine, based on the first set of delay values, a first time domain resource allocation of downlink shared channel resources associated with the first acknowledgment feedback, and transmit the first acknowledgment feedback for the first time domain resource allocation via the first set of uplink resources.

The communications manager 815 may also identify a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station, determine, based on the first set of delay values, a first uplink resource for transmitting a first acknowledgment feedback associated with the first downlink data transmission, receive a first downlink control channel transmission during the first set of downlink control channel monitoring occasions that indicates a first downlink shared channel resource for a first downlink data transmission to the UE, monitor the first downlink shared channel resource for the first downlink data transmission, and transmit, based on the monitoring, the first acknowledgment feedback to the base station via the first uplink resource. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
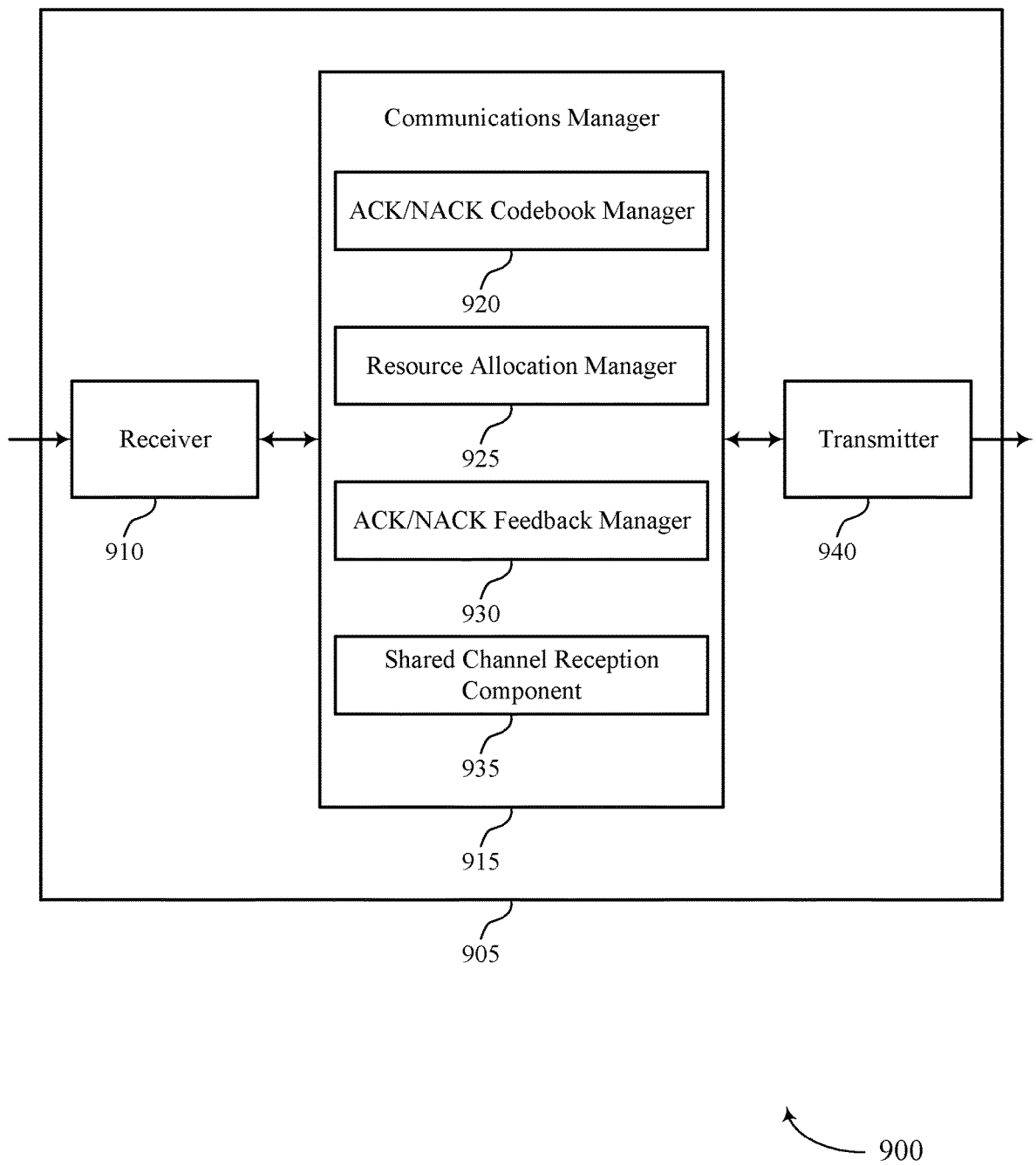

FIG. 9 shows a block diagram 900 of a device 905 that supports acknowledgment feedback techniques in wireless communications in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to acknowledgment feedback techniques in wireless communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an ACK/NACK codebook manager 920, a resource allocation manager 925, an ACK/NACK feedback manager 930, and a shared channel reception component 935. The communications manager 915 may be an example of aspects of the communications manager 1110 described herein.

The ACK/NACK codebook manager 920 may identify a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel. In some cases, the ACK/NACK codebook manager 920 may identify, at a UE, a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station and determine, based on the first set of delay values, a first uplink resource for transmitting a first acknowledgment feedback associated with the first downlink data transmission.

The resource allocation manager 925 may determine, based on the first set of delay values, a first time domain resource allocation of downlink shared channel resources associated with the first acknowledgment feedback. In some cases, the resource allocation manager 925 may receive a first downlink control channel transmission during the first set of downlink control channel monitoring occasions that indicates a first downlink shared channel resource for a first downlink data transmission to the UE.

The ACK/NACK feedback manager 930 may transmit the first acknowledgment feedback for the first time domain resource allocation via the first set of uplink resources. In some cases, the shared channel reception component 935 may monitor the first downlink shared channel resource for the first downlink data transmission, and the ACK/NACK feedback manager 930 may transmit, based on the monitoring, the first acknowledgment feedback to the base station via the first uplink resource.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
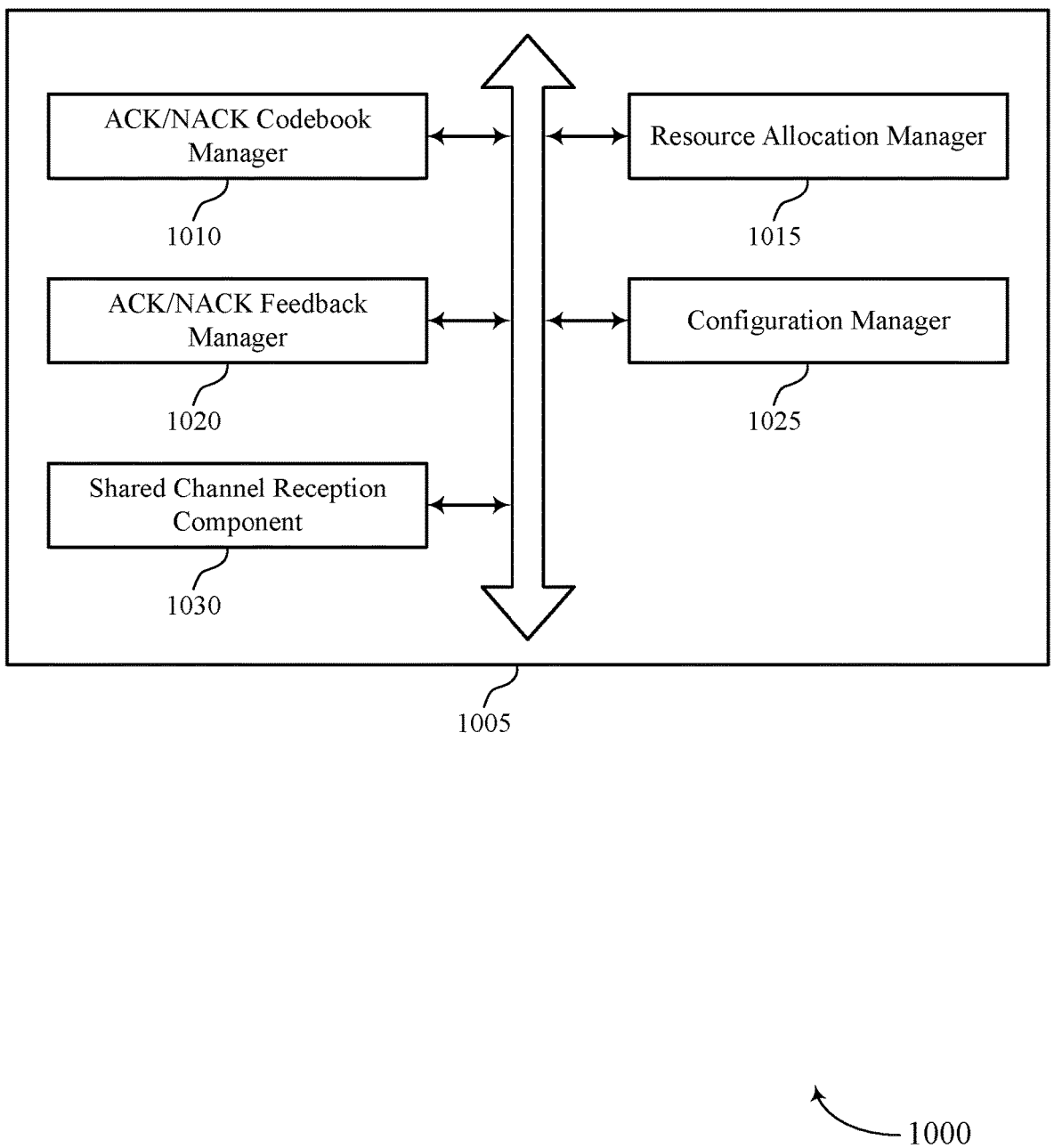
FIG. 10 shows a block diagram of a communications manager that supports acknowledgment feedback techniques in wireless communications in accordance with aspects of the present disclosure.

FIG. 10 shows a block diagram 1000 of a communications manager 1005 that supports acknowledgment feedback techniques in wireless communications in accordance with aspects of the present disclosure. The communications manager 1005 may be an example of aspects of a communications manager 815, a communications manager 915, or a communications manager 1110 described herein. The communications manager 1005 may include an ACK/NACK codebook manager 1010, a resource allocation manager 1015, an ACK/NACK feedback manager 1020, a configuration manager 1025, and a shared channel reception component 1030. Each of these modules may communicate, directly or indirectly, with one another (e.g., via one or more buses).

In some examples, the ACK/NACK codebook manager 1010 may identify a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel. In some examples, the ACK/NACK codebook manager 1010 may determine, based on the first set of delay values, a first uplink resource for transmitting a first acknowledgment feedback associated with the first downlink data transmission. In some examples, the ACK/NACK codebook manager 1010 may determine, based on the second set of delay values, a second uplink resource for transmitting a second acknowledgment feedback associated with the second downlink data transmission, where the second uplink resource is different than the first uplink resource. In some cases, the first set of delay values is associated with a first wireless service having a first TTI, and the second set of delay values is associated with a second wireless service having a second TTI that is shorter than the first TTI.

In some cases, the first set of delay values correspond to downlink shared channel time domain resources that span a first number of orthogonal frequency division multiplexing (OFDM) symbols and the second set of delay values correspond to downlink shared channel time domain resources that span a second number of OFDM symbols. In some cases, the first number of OFDM symbols span more than a threshold number of OFDM symbols and the second number of OFDM symbols is less than or equal to the threshold number of OFDM symbols. In some cases, the second number of OFDM symbols are included in an enumerated set of numbers of OFDM symbols, and the first number of OFDM symbols correspond to other available numbers of OFDM symbols outside of the enumerated set of numbers of OFDM symbols. In some examples, the units for measuring time domain differences include one or more of slots, sub-slots, orthogonal frequency division multiplexing (OFDM) symbols, or any combinations thereof. In some cases, the first set of delay values and the second set of delay values have same or different units for measuring time domain differences between a downlink data transmission and the first set of uplink resources.

In some examples, the ACK/NACK codebook manager 1010 may identify a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station. In some cases, the first set of downlink control channel monitoring occasions correspond to downlink control channel monitoring occasions within an initial number of orthogonal frequency division multiplexing (OFDM) symbols of a slot, and the second set of downlink control channel monitoring occasions correspond to downlink control channel monitoring occasions that are after the initial number of OFDM symbols of the slot. In some cases, the initial number of OFDM symbols corresponds to up to three initial symbols of the slot. In some cases, the first set of delay values is associated with a first wireless service having a first TTI, and the second set of delay values is associated with a second wireless service having a second TTI that is shorter than the first TTI.

In some cases, the first wireless service is associated with downlink shared channel resources that span more than a threshold number of orthogonal frequency division multiplexing (OFDM) symbols, and the second wireless service is associated with downlink shared channel resources that span a number of OFDM symbols that is less than or equal to the threshold number of OFDM symbols. In some cases, the second wireless service is associated with downlink shared channel resources that span a number of orthogonal frequency division multiplexing (OFDM) symbols that are included in an enumerated set of numbers of OFDM symbols, and the first wireless service is associated with downlink shared channel resources that span numbers of OFDM symbols that are outside of the enumerated set of numbers of OFDM symbols. In some cases, the second wireless service is associated with downlink control channel monitoring occasions that are after an initial number of orthogonal frequency division multiplexing (OFDM) symbols of the TTI. In some cases, the first wireless service is associated with downlink shared channel resources that span a more than a threshold number of orthogonal frequency division multiplexing (OFDM) symbols and the second wireless service is associated with downlink shared channel resources that span a number of OFDM symbols that are less than or equal to the threshold number of OFDM symbols.

The resource allocation manager 1015 may determine, based on the first set of delay values, a first time domain resource allocation of downlink shared channel resources associated with the first acknowledgment feedback. In some examples, the resource allocation manager 1015 may receive a first downlink control channel transmission during the first set of downlink control channel monitoring occasions that indicates a first downlink shared channel resource for a first downlink data transmission to the UE.

In some examples, the resource allocation manager 1015 may determine, based on the second set of delay values, a second time domain resource allocation of downlink shared channel resources associated with the second acknowledgment feedback, where the second time domain resource allocation has a same ending orthogonal frequency division multiplexing (OFDM) symbol as the first time domain resource allocation.

In some examples, the resource allocation manager 1015 may receive a second downlink control channel transmission during the second set of downlink control channel monitoring occasions that indicates a second downlink shared channel resource for a second downlink data transmission to the UE, where the second downlink shared channel resource overlaps with the first downlink shared channel resource.

The ACK/NACK feedback manager 1020 may transmit the first acknowledgment feedback for the first time domain resource allocation via the first set of uplink resources. In some examples, the ACK/NACK feedback manager 1020 may transmit the second acknowledgment feedback for the second time domain resource allocation via a second set of uplink resources that is different than the first set of uplink resources. In some cases, the first set of uplink resources and the second set of uplink resources are different uplink resources within a same slot. In some cases, the first uplink resource and the second uplink resource correspond to different feedback bits in a same uplink control channel transmission.

In some cases, a set of overlapping downlink data transmissions from the base station each end during a same transmission time interval, and the first acknowledgment feedback is associated with latest starting data transmission of the set of overlapping downlink data transmissions. In some cases, a set of overlapping downlink data transmissions from the base station each end during a same transmission time interval, and the first acknowledgment feedback is associated with a data transmission of the set of overlapping downlink data transmissions that has a shortest time duration.

The shared channel reception component 1030 may monitor the first downlink shared channel resource for the first downlink data transmission. In some examples, the shared channel reception component 1030 may monitor the second downlink shared channel resource for the second downlink data transmission.

The configuration manager 1025 may receive, from the base station, configuration information that configures the first set of delay values and the second set of delay values. In some cases, the configuration information includes a downlink shared channel time domain resource allocation list that links the first time domain resource allocation with the first set of delay values and that links a second time domain resource allocation of downlink shared channel resources with the second set of delay values. In some cases, the first set of delay values and the second set of delay values are provided in a downlink data to uplink acknowledgment table that is provided with the downlink shared channel time domain resource allocation list.

Figure 11:
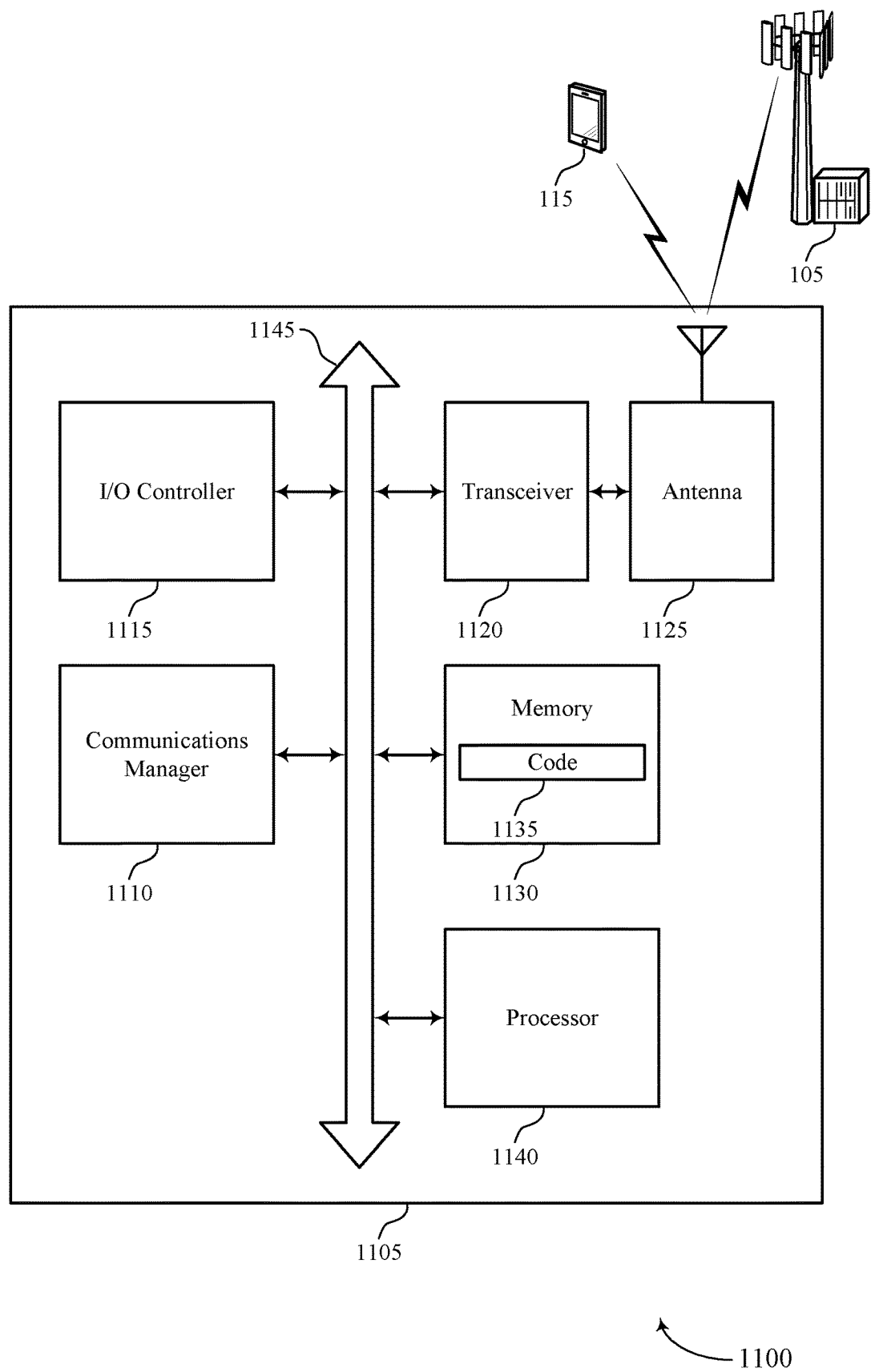
FIG. 11 shows a diagram of a system including a device that supports acknowledgment feedback techniques in wireless communications in accordance with aspects of the present disclosure.

FIG. 11 shows a diagram of a system 1100 including a device 1105 that supports acknowledgment feedback techniques in wireless communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel, determine, based on the first set of delay values, a first time domain resource allocation of downlink shared channel resources associated with the first acknowledgment feedback, and transmit the first acknowledgment feedback for the first time domain resource allocation via the first set of uplink resources.

The communications manager 1110 may also identify a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station, determine, based on the first set of delay values, a first uplink resource for transmitting a first acknowledgment feedback associated with the first downlink data transmission, receive a first downlink control channel transmission during the first set of downlink control channel monitoring occasions that indicates a first downlink shared channel resource for a first downlink data transmission to the UE, monitor the first downlink shared channel resource for the first downlink data transmission, and transmit, based on the monitoring, the first acknowledgment feedback to the base station via the first uplink resource.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting acknowledgment feedback techniques in wireless communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
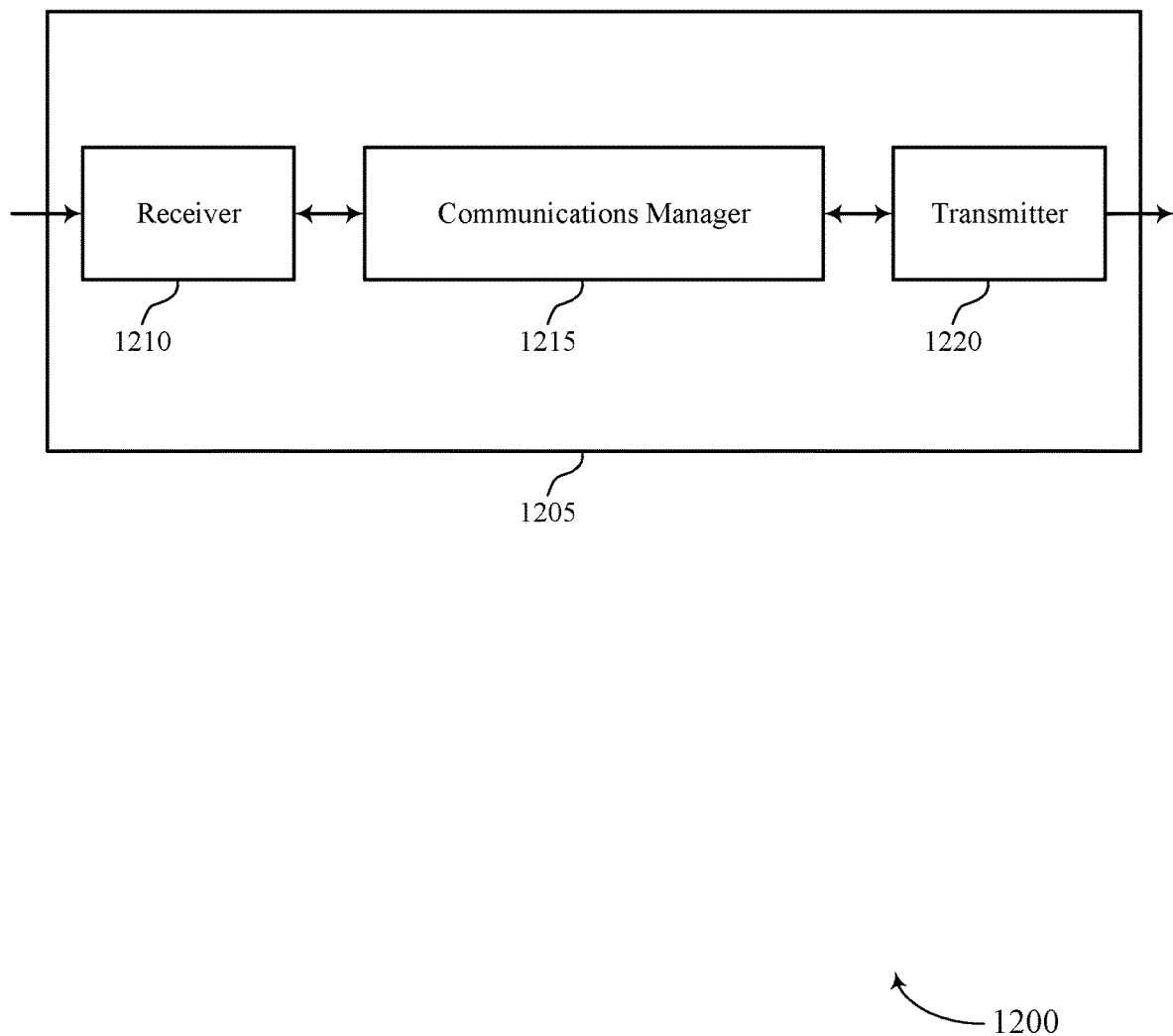
FIGS. 12 and 13 show block diagrams of devices that support acknowledgment feedback techniques in wireless communications in accordance with aspects of the present disclosure.

FIG. 12 shows a block diagram 1200 of a device 1205 that supports acknowledgment feedback techniques in wireless communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to acknowledgment feedback techniques in wireless communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a first set of uplink resources for receiving a first acknowledgment feedback from a UE and a first set of delay values associated with the first set of uplink resources, identify, at the base station, a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel, transmit a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation, and monitor, responsive to the transmitting, the first set of uplink resources for the first acknowledgment feedback from the UE and the second set of uplink resources for the second acknowledgment feedback from the UE.

The communications manager 1215 may also identify a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE, determine, based on the first set of delay values, a first uplink resource for receiving a first acknowledgment feedback associated with the first downlink data transmission, transmit a first downlink control channel transmission during the first set of UE downlink control channel monitoring occasions that indicates a first downlink shared channel resource for a first downlink data transmission to the UE, transmit the first downlink data transmission to the UE via the first downlink shared channel resource, and monitor the first uplink resource for the first acknowledgment feedback. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
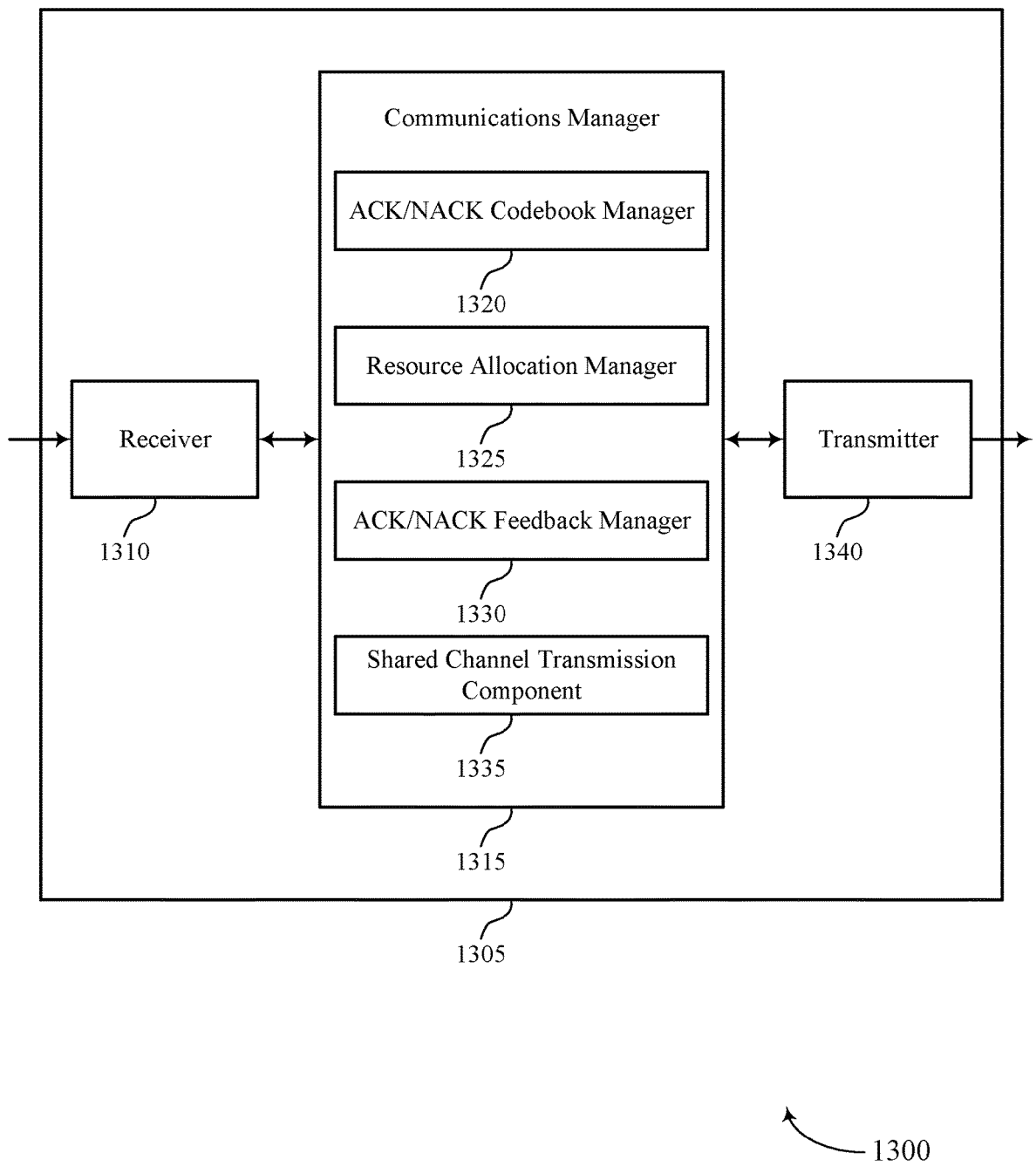

FIG. 13 shows a block diagram 1300 of a device 1305 that supports acknowledgment feedback techniques in wireless communications in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to acknowledgment feedback techniques in wireless communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an ACK/NACK codebook manager 1320, a resource allocation manager 1325, an ACK/NACK feedback manager 1330, and a shared channel transmission component 1335. The communications manager 1315 may be an example of aspects of the communications manager 1510 described herein.

The ACK/NACK codebook manager 1320 may identify a first set of uplink resources for receiving a first acknowledgment feedback from a UE and a first set of delay values associated with the first set of uplink resources and identify, at the base station, a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel.

In some cases, the ACK/NACK codebook manager 1320 may identify a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE and determine, based on the first set of delay values, a first uplink resource for receiving a first acknowledgment feedback associated with the first downlink data transmission.

The resource allocation manager 1325 may transmit a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation. In some cases, the resource allocation manager 1325 may transmit a first downlink control channel transmission during the first set of UE downlink control channel monitoring occasions that indicates a first downlink shared channel resource for a first downlink data transmission to the UE.

The ACK/NACK feedback manager 1330 may monitor, responsive to the transmitting, the first set of uplink resources for the first acknowledgment feedback from the UE and the second set of uplink resources for the second acknowledgment feedback from the UE. The shared channel transmission component 1335 may transmit the first downlink data transmission to the UE via the first downlink shared channel resource.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
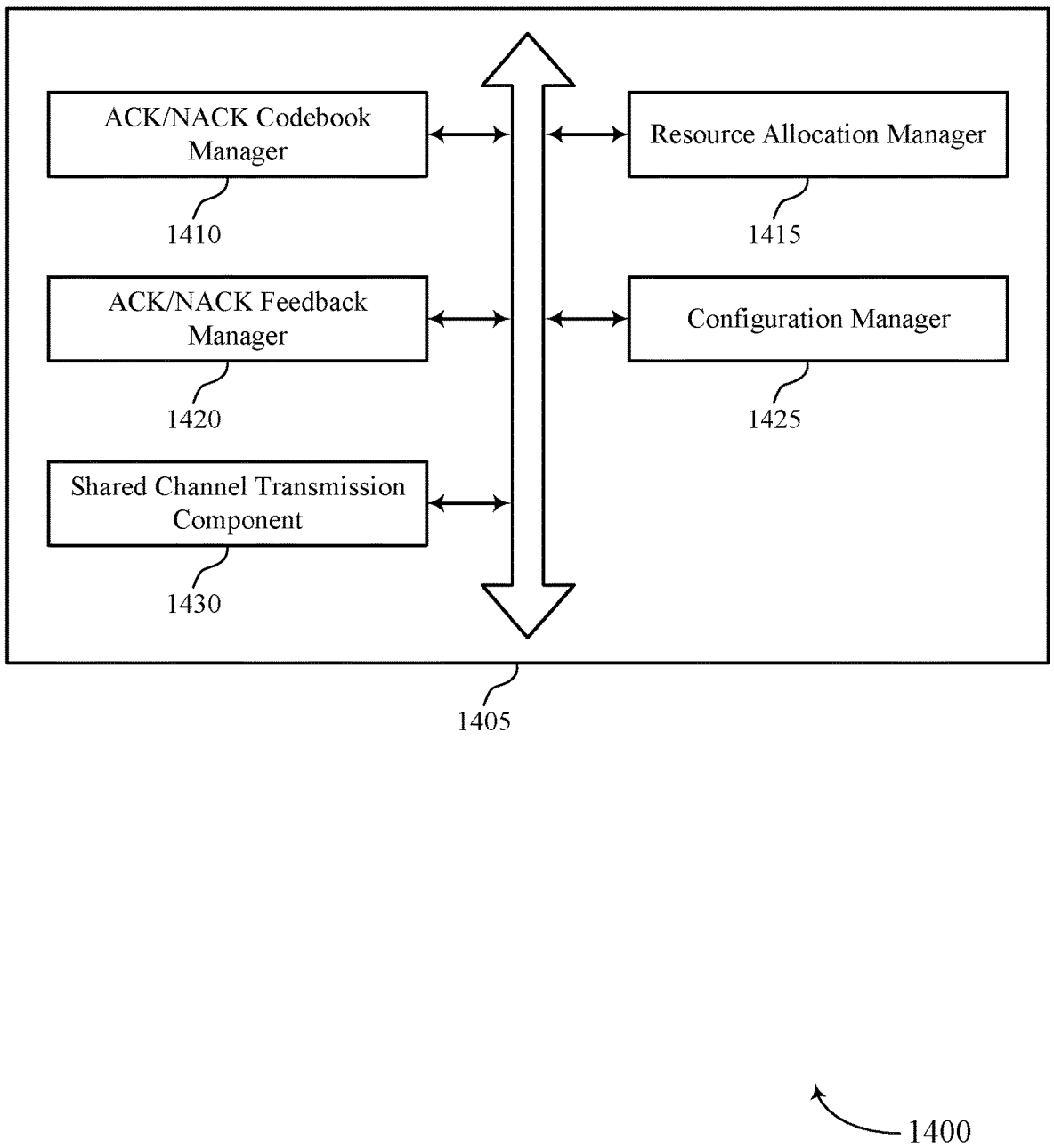
FIG. 14 shows a block diagram of a communications manager that supports acknowledgment feedback techniques in wireless communications in accordance with aspects of the present disclosure.

FIG. 14 shows a block diagram 1400 of a communications manager 1405 that supports acknowledgment feedback techniques in wireless communications in accordance with aspects of the present disclosure. The communications manager 1405 may be an example of aspects of a communications manager 1215, a communications manager 1315, or a communications manager 1510 described herein. The communications manager 1405 may include an ACK/NACK codebook manager 1410, a resource allocation manager 1415, an ACK/NACK feedback manager 1420, a configuration manager 1425, and a shared channel transmission component 1430. Each of these modules may communicate, directly or indirectly, with one another (e.g., via one or more buses).

The ACK/NACK codebook manager 1410 may identify a first set of uplink resources for receiving a first acknowledgment feedback from a UE and a first set of delay values associated with the first set of uplink resources. In some examples, the ACK/NACK codebook manager 1410 may identify a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel.

In some examples, the ACK/NACK codebook manager 1410 may identify a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE. In some examples, the ACK/NACK codebook manager 1410 may determine, based on the second set of delay values, a second uplink resource for receiving a second acknowledgment feedback associated with the second downlink data transmission, where the second uplink resource is different than the first uplink resource.

In some examples, the ACK/NACK codebook manager 1410 may determine, based on the first set of delay values, a first uplink resource for receiving a first acknowledgment feedback associated with the first downlink data transmission. In some examples, the units for measuring time domain differences include one or more of slots, sub-slots, orthogonal frequency division multiplexing (OFDM) symbols, or any combinations thereof.

In some cases, the first set of delay values is associated with a first wireless service having a first TTI, and the second set of delay values is associated with a second wireless service having a second TTI that is shorter than the first TTI. In some cases, the second time domain resource allocation has a same ending orthogonal frequency division multiplexing (OFDM) symbol as the first time domain resource allocation. In some cases, the first set of uplink resources and the second set of uplink resources are different uplink resources within a same slot.

In some cases, the first set of delay values correspond to downlink shared channel time domain resources that span a first number of orthogonal frequency division multiplexing (OFDM) symbols and the second set of delay values correspond to downlink shared channel time domain resources that span a second number of OFDM symbols. In some cases, the first number of OFDM symbols span more than a threshold number of OFDM symbols and the second number of OFDM symbols is less than or equal to the threshold number of OFDM symbols. In some cases, the second number of OFDM symbols are included in an enumerated set of numbers of OFDM symbols, and the first number of OFDM symbols correspond to other available numbers of OFDM symbols outside of the enumerated set of numbers of OFDM symbols.

In some cases, the first set of downlink control channel monitoring occasions correspond to downlink control channel monitoring occasions within an initial number of orthogonal frequency division multiplexing (OFDM) symbols of a slot, and the second set of downlink control channel monitoring occasions correspond to downlink control channel monitoring occasions that are after the initial number of OFDM symbols of the slot. In some cases, the initial number of OFDM symbols corresponds to up to three initial OFDM symbols of the slot. In some cases, the first uplink resource and the second uplink resource correspond to different feedback bits in a same uplink control channel transmission. In some cases, the first set of delay values is associated with a first wireless service having a first TTI, and the second set of delay values is associated with a second wireless service having a second TTI that is shorter than the first TTI.

In some cases, the second wireless service is associated with downlink control channel monitoring occasions that are after an initial number of orthogonal frequency division multiplexing (OFDM) symbols of the TTI. In some cases, the first wireless service is associated with downlink shared channel resources that span a more than a threshold number of orthogonal frequency division multiplexing (OFDM) symbols and the second wireless service is associated with downlink shared channel resources that span a number of OFDM symbols that are less than or equal to the threshold number of OFDM symbols.

The resource allocation manager 1415 may transmit a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation.

In some examples, the resource allocation manager 1415 may transmit a first downlink control channel transmission during the first set of UE downlink control channel monitoring occasions that indicates a first downlink shared channel resource for a first downlink data transmission to the UE. In some examples, the resource allocation manager 1415 may transmit a second downlink control channel transmission during the second set of downlink control channel monitoring occasions that indicates a second downlink shared channel resource for a second downlink data transmission to the UE, where the second downlink shared channel resource overlaps with the first downlink shared channel resource.

The ACK/NACK feedback manager 1420 may monitor, responsive to the transmitting, the first set of uplink resources for the first acknowledgment feedback from the UE and the second set of uplink resources for the second acknowledgment feedback from the UE.

In some cases, a set of overlapping downlink data transmissions from the base station each end during a same transmission time interval, and the first acknowledgment feedback is associated with latest starting data transmission of the set of overlapping downlink data transmissions. In some cases, a set of overlapping downlink data transmissions from the base station each end during a same transmission time interval, and the first acknowledgment feedback is associated with a data transmission of the set of overlapping downlink data transmissions that has a shortest time duration.

The shared channel transmission component 1430 may transmit the first downlink data transmission to the UE via the first downlink shared channel resource. In some examples, the shared channel transmission component 1430 may transmit the second downlink data transmission to the UE via the second downlink shared channel resource.

The configuration manager 1425 may transmit, to the UE, configuration information that configures the first set of delay values and the second set of delay values. In some cases, the configuration information includes a downlink shared channel time domain resource allocation list that links the first time domain resource allocation with the first set of delay values and that links a second time domain resource allocation of downlink shared channel resources with the second set of delay values. In some cases, the first set of delay values and the second set of delay values are provided in a downlink data to uplink acknowledgment table that is provided with the downlink shared channel time domain resource allocation list.

Figure 15:
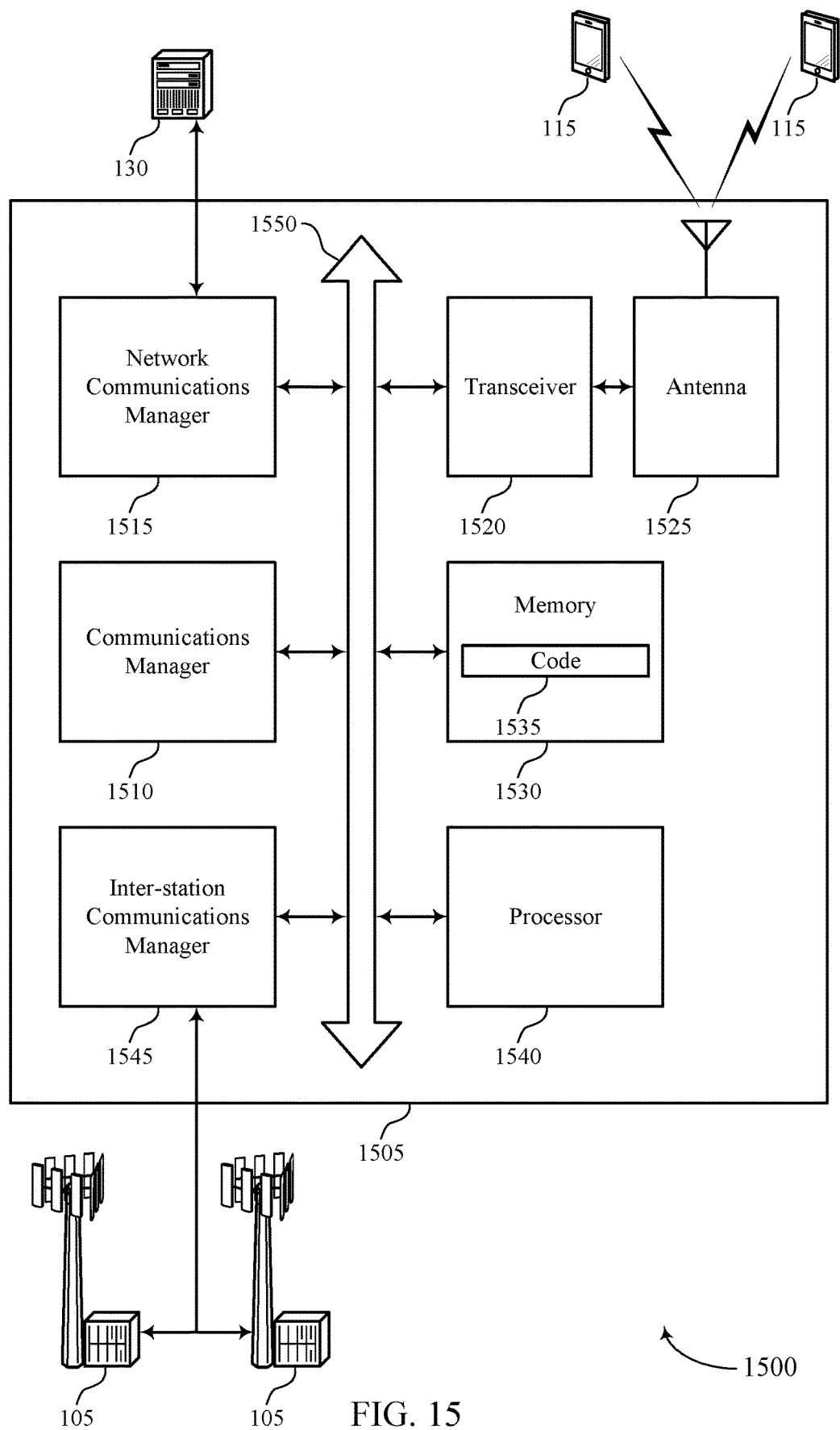
FIG. 15 shows a diagram of a system including a device that supports acknowledgment feedback techniques in wireless communications in accordance with aspects of the present disclosure.

FIG. 15 shows a diagram of a system 1500 including a device 1505 that supports acknowledgment feedback techniques in wireless communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a first set of uplink resources for receiving a first acknowledgment feedback from a UE and a first set of delay values associated with the first set of uplink resources, identify, at the base station, a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel, transmit a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation, and monitor, responsive to the transmitting, the first set of uplink resources for the first acknowledgment feedback from the UE and the second set of uplink resources for the second acknowledgment feedback from the UE.

The communications manager 1510 may also identify a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE, determine, based on the first set of delay values, a first uplink resource for receiving a first acknowledgment feedback associated with the first downlink data transmission, transmit a first downlink control channel transmission during the first set of UE downlink control channel monitoring occasions that indicates a first downlink shared channel resource for a first downlink data transmission to the UE, transmit the first downlink data transmission to the UE via the first downlink shared channel resource, and monitor the first uplink resource for the first acknowledgment feedback.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting acknowledgment feedback techniques in wireless communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
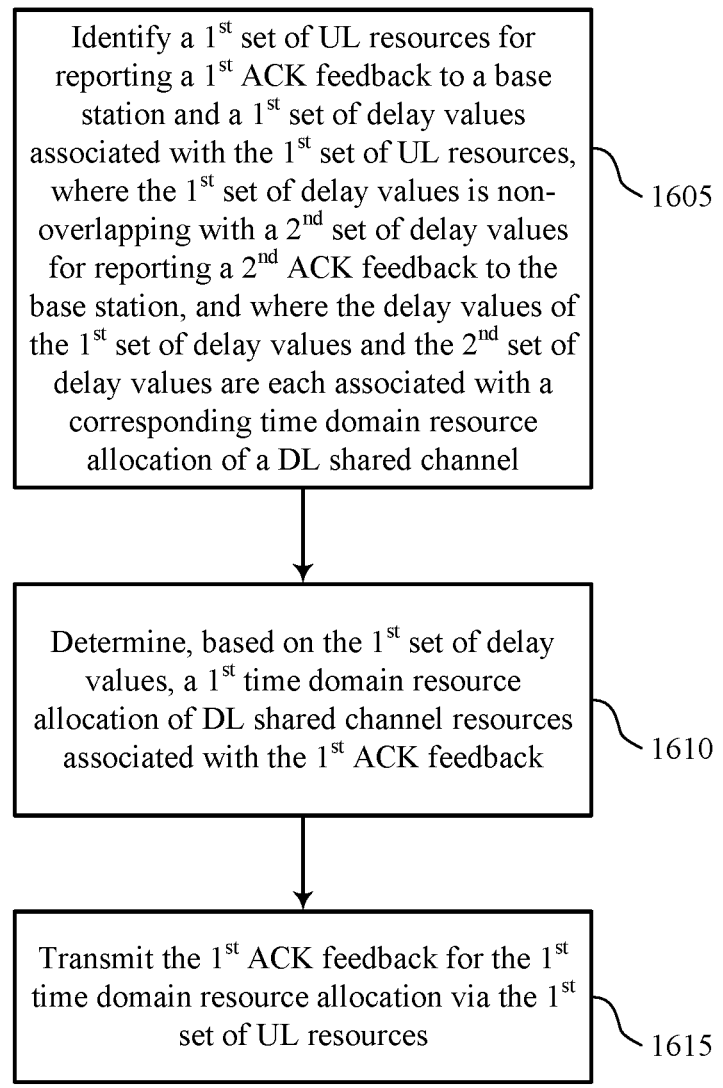
FIGS. 16 through 22 show flowcharts illustrating methods that support acknowledgment feedback techniques in wireless communications in accordance with aspects of the present disclosure.

FIG. 16 shows a flowchart illustrating a method 1600 that supports acknowledgment feedback techniques in wireless communications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel. The operations of 1605 may be performed according to the methods described herein. In some examples, aspects of the operations of 1605 may be performed by an ACK/NACK codebook manager as described with reference to FIGS. 8 through 11.

At 1610, the UE may determine, based on the first set of delay values, a first time domain resource allocation of downlink shared channel resources associated with the first acknowledgment feedback. The operations of 1610 may be performed according to the methods described herein. In some examples, aspects of the operations of 1610 may be performed by a resource allocation manager as described with reference to FIGS. 8 through 11.

At 1615, the UE may transmit the first acknowledgment feedback for the first time domain resource allocation via the first set of uplink resources. The operations of 1615 may be performed according to the methods described herein. In some examples, aspects of the operations of 1615 may be performed by an ACK/NACK feedback manager as described with reference to FIGS. 8 through 11.

Figure 17:
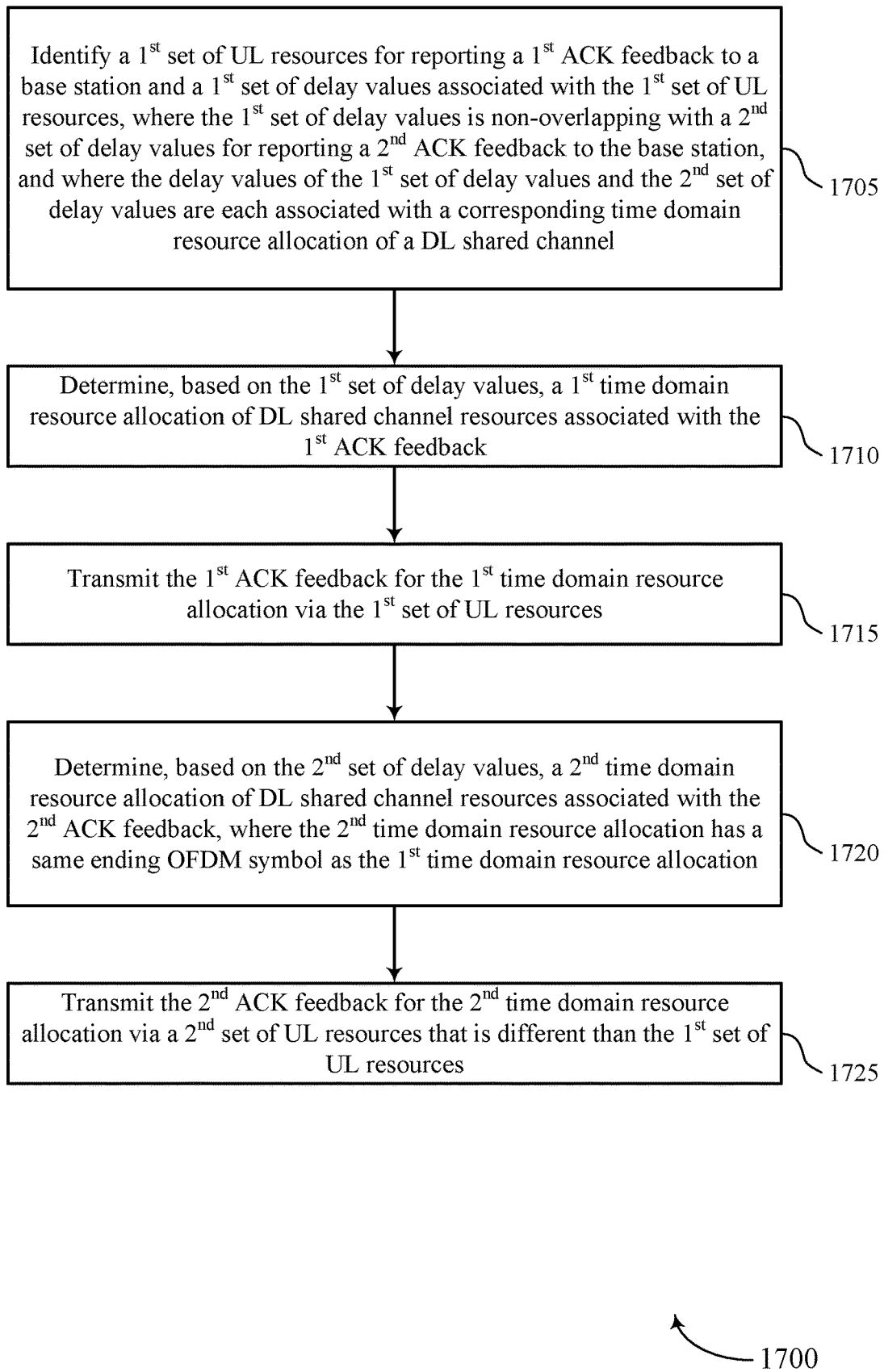

FIG. 17 shows a flowchart illustrating a method 1700 that supports acknowledgment feedback techniques in wireless communications in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may identify a first set of uplink resources for reporting a first acknowledgment feedback to a base station and a first set of delay values associated with the first set of uplink resources, where the first set of delay values is non-overlapping with a second set of delay values for reporting a second acknowledgment feedback to the base station, and where the delay values of the first set of delay values and the second set of delay values are each associated with a corresponding time domain resource allocation of a downlink shared channel. The operations of 1705 may be performed according to the methods described herein. In some examples, aspects of the operations of 1705 may be performed by an ACK/NACK codebook manager as described with reference to FIGS. 8 through 11.

At 1710, the UE may determine, based on the first set of delay values, a first time domain resource allocation of downlink shared channel resources associated with the first acknowledgment feedback. The operations of 1710 may be performed according to the methods described herein. In some examples, aspects of the operations of 1710 may be performed by a resource allocation manager as described with reference to FIGS. 8 through 11.

At 1715, the UE may transmit the first acknowledgment feedback for the first time domain resource allocation via the first set of uplink resources. The operations of 1715 may be performed according to the methods described herein. In some examples, aspects of the operations of 1715 may be performed by an ACK/NACK feedback manager as described with reference to FIGS. 8 through 11.

At 1720, the UE may determine, based on the second set of delay values, a second time domain resource allocation of downlink shared channel resources associated with the second acknowledgment feedback, where the second time domain resource allocation has a same ending orthogonal frequency division multiplexing (OFDM) symbol as the first time domain resource allocation. The operations of 1720 may be performed according to the methods described herein. In some examples, aspects of the operations of 1720 may be performed by a resource allocation manager as described with reference to FIGS. 8 through 11.

At 1725, the UE may transmit the second acknowledgment feedback for the second time domain resource allocation via a second set of uplink resources that is different than the first set of uplink resources. The operations of 1725 may be performed according to the methods described herein. In some examples, aspects of the operations of 1725 may be performed by an ACK/NACK feedback manager as described with reference to FIGS. 8 through 11.

Figure 18:
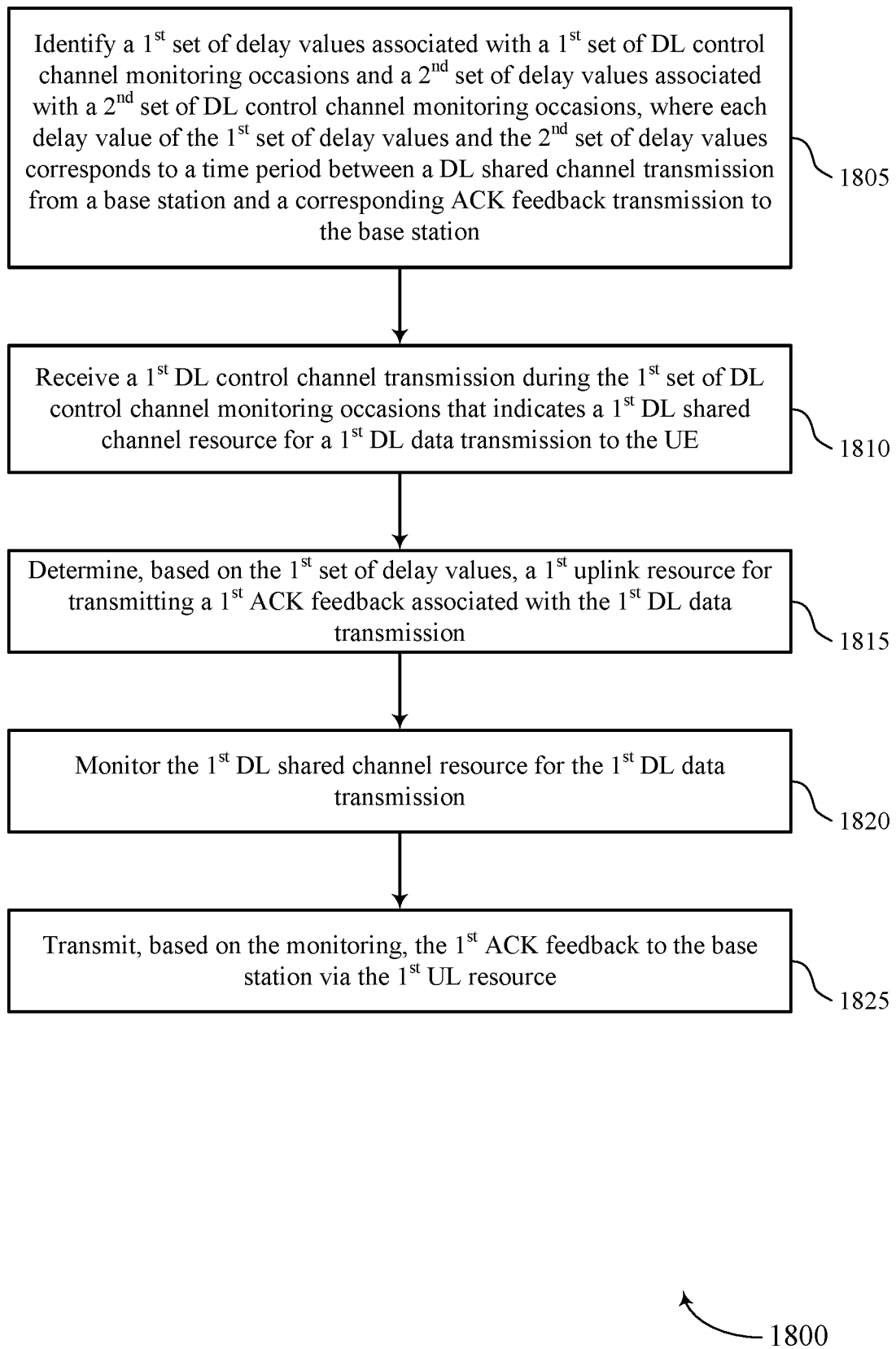

FIG. 18 shows a flowchart illustrating a method 1800 that supports acknowledgment feedback techniques in wireless communications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may identify a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station. The operations of 1805 may be performed according to the methods described herein. In some examples, aspects of the operations of 1805 may be performed by an ACK/NACK codebook manager as described with reference to FIGS. 8 through 11.

At 1810, the UE may receive a first downlink control channel transmission during the first set of downlink control channel monitoring occasions that indicates a first downlink shared channel resource for a first downlink data transmission to the UE. The operations of 1810 may be performed according to the methods described herein. In some examples, aspects of the operations of 1810 may be performed by a resource allocation manager as described with reference to FIGS. 8 through 11.

At 1815, the UE may determine, based on the first set of delay values, a first uplink resource for transmitting a first acknowledgment feedback associated with the first downlink data transmission. The operations of 1815 may be performed according to the methods described herein. In some examples, aspects of the operations of 1815 may be performed by an ACK/NACK codebook manager as described with reference to FIGS. 8 through 11.

At 1820, the UE may monitor the first downlink shared channel resource for the first downlink data transmission. The operations of 1820 may be performed according to the methods described herein. In some examples, aspects of the operations of 1820 may be performed by a shared channel reception component as described with reference to FIGS. 8 through 11.

At 1825, the UE may transmit, based on the monitoring, the first acknowledgment feedback to the base station via the first uplink resource. The operations of 1825 may be performed according to the methods described herein. In some examples, aspects of the operations of 1825 may be performed by an ACK/NACK feedback manager as described with reference to FIGS. 8 through 11.

Figure 19:
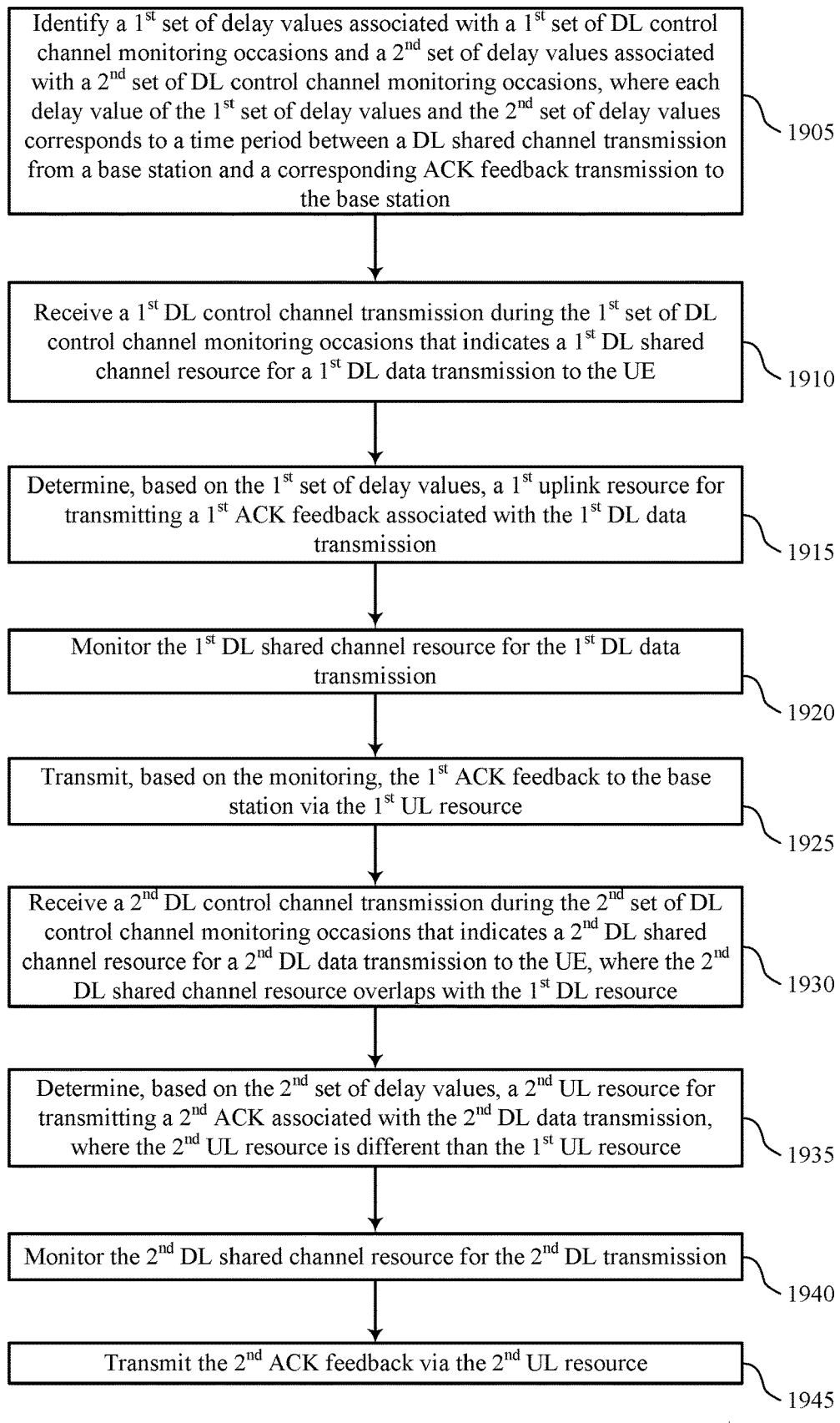

FIG. 19 shows a flowchart illustrating a method 1900 that supports acknowledgment feedback techniques in wireless communications in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may identify a first set of delay values associated with a first set of downlink control channel monitoring occasions and a second set of delay values associated with a second set of downlink control channel monitoring occasions, where each delay value of the first set of delay values and the second set of delay values corresponds to a time period between a downlink shared channel transmission from a base station and a corresponding acknowledgment feedback transmission to the base station. The operations of 1905 may be performed according to the methods described herein. In some examples, aspects of the operations of 1905 may be performed by an ACK/NACK codebook manager as described with reference to FIGS. 8 through 11.

At 1910, the UE may receive a first downlink control channel transmission during the first set of downlink control channel monitoring occasions that indicates a first downlink shared channel resource for a first downlink data transmission to the UE. The operations of 1910 may be performed according to the methods described herein. In some examples, aspects of the operations of 1910 may be performed by a resource allocation manager as described with reference to FIGS. 8 through 11.

At 1915, the UE may determine, based on the first set of delay values, a first uplink resource for transmitting a first acknowledgment feedback associated with the first downlink data transmission. The operations of 1915 may be performed according to the methods described herein. In some examples, aspects of the operations of 1915 may be performed by an ACK/NACK codebook manager as described with reference to FIGS. 8 through 11.

At 1920, the UE may monitor the first downlink shared channel resource for the first downlink data transmission. The operations of 1920 may be performed according to the methods described herein. In some examples, aspects of the operations of 1920 may be performed by a shared channel reception component as described with reference to FIGS. 8 through 11.

At 1925, the UE may transmit, based on the monitoring, the first acknowledgment feedback to the base station via the first uplink resource. The operations of 1925 may be performed according to the methods described herein. In some examples, aspects of the operations of 1925 may be performed by an ACK/NACK feedback manager as described with reference to FIGS. 8 through 11.

At 1930, the UE may receive a second downlink control channel transmission during the second set of downlink control channel monitoring occasions that indicates a second downlink shared channel resource for a second downlink data transmission to the UE, where the second downlink shared channel resource overlaps with the first downlink shared channel resource. The operations of 1930 may be performed according to the methods described herein. In some examples, aspects of the operations of 1930 may be performed by a resource allocation manager as described with reference to FIGS. 8 through 11.

At 1935, the UE may determine, based on the second set of delay values, a second uplink resource for transmitting a second acknowledgment feedback associated with the second downlink data transmission, where the second uplink resource is different than the first uplink resource. The operations of 1935 may be performed according to the methods described herein. In some examples, aspects of the operations of 1935 may be performed by an ACK/NACK codebook manager as described with reference to FIGS. 8 through 11.

At 1940, the UE may monitor the second downlink shared channel resource for the second downlink data transmission. The operations of 1940 may be performed according to the methods described herein. In some examples, aspects of the operations of 1940 may be performed by a shared channel reception component as described with reference to FIGS. 8 through 11.

At 1945, the UE may transmit the second acknowledgment feedback to the base station via the second uplink resource. The operations of 1945 may be performed according to the methods described herein. In some examples, aspects of the operations of 1945 may be performed by an ACK/NACK feedback manager as described with reference to FIGS. 8 through 11.

Figure 20:
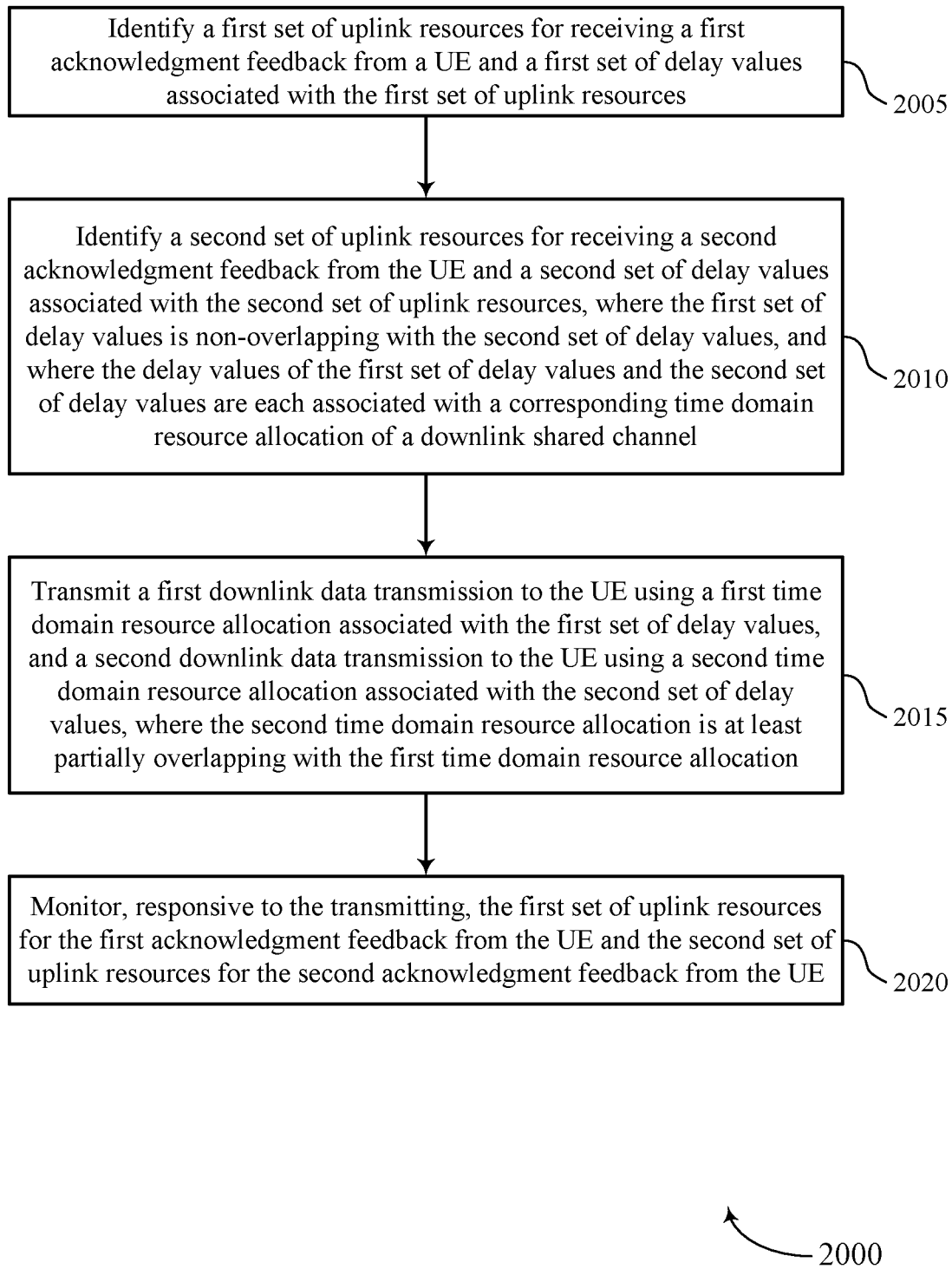

FIG. 20 shows a flowchart illustrating a method 2000 that supports acknowledgment feedback techniques in wireless communications in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may identify a first set of uplink resources for receiving a first acknowledgment feedback from a UE and a first set of delay values associated with the first set of uplink resources. The operations of 2005 may be performed according to the methods described herein. In some examples, aspects of the operations of 2005 may be performed by an ACK/NACK codebook manager as described with reference to FIGS. 12 through 15.

At 2010, the base station may identify a second set of uplink resources for receiving a second acknowledgment feedback from the UE and a second set of delay values associated with the second set of uplink resources, where the first set of delay values is non-overlapping with the second set of delay values, and where the delay values of the first set of delay values and the second set of delay values are each associated with a corresponding time domain resource allocation of a downlink shared channel. The operations of 2010 may be performed according to the methods described herein. In some examples, aspects of the operations of 2010 may be performed by an ACK/NACK codebook manager as described with reference to FIGS. 12 through 15.

At 2015, the base station may transmit a first downlink data transmission to the UE using a first time domain resource allocation associated with the first set of delay values, and a second downlink data transmission to the UE using a second time domain resource allocation associated with the second set of delay values, where the second time domain resource allocation is at least partially overlapping with the first time domain resource allocation. The operations of 2015 may be performed according to the methods described herein. In some examples, aspects of the operations of 2015 may be performed by a resource allocation manager as described with reference to FIGS. 12 through 15.

At 2020, the base station may monitor, responsive to the transmitting, the first set of uplink resources for the first acknowledgment feedback from the UE and the second set of uplink resources for the second acknowledgment feedback from the UE. The operations of 2020 may be performed according to the methods described herein. In some examples, aspects of the operations of 2020 may be performed by an ACK/NACK feedback manager as described with reference to FIGS. 12 through 15.

Figure 21:
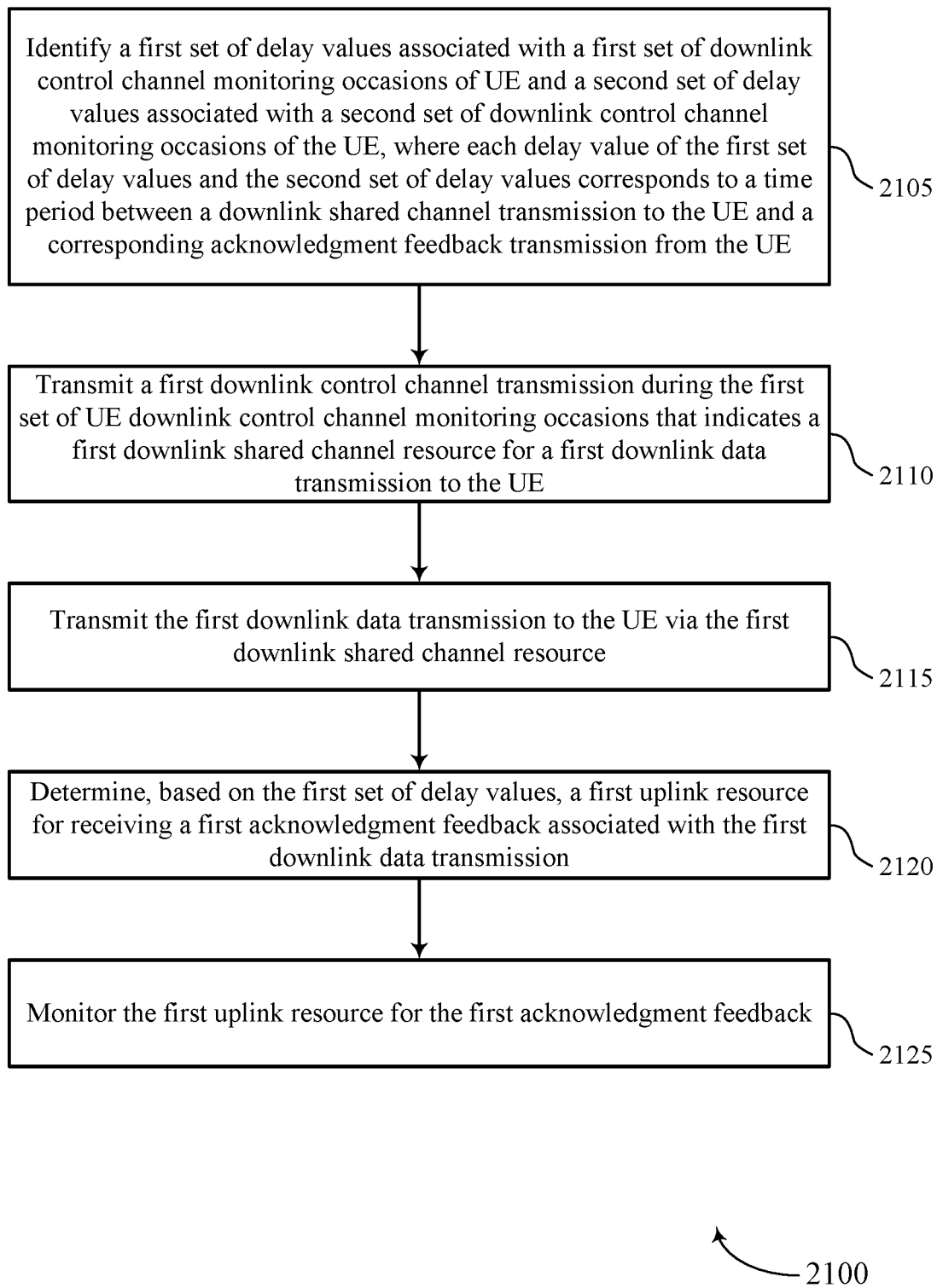

FIG. 21 shows a flowchart illustrating a method 2100 that supports acknowledgment feedback techniques in wireless communications in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may identify a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE. The operations of 2105 may be performed according to the methods described herein. In some examples, aspects of the operations of 2105 may be performed by an ACK/NACK codebook manager as described with reference to FIGS. 12 through 15.

At 2110, the base station may transmit a first downlink control channel transmission during the first set of UE downlink control channel monitoring occasions that indicates a first downlink shared channel resource for a first downlink data transmission to the UE. The operations of 2110 may be performed according to the methods described herein. In some examples, aspects of the operations of 2110 may be performed by a resource allocation manager as described with reference to FIGS. 12 through 15.

At 2115, the base station may transmit the first downlink data transmission to the UE via the first downlink shared channel resource. The operations of 2115 may be performed according to the methods described herein. In some examples, aspects of the operations of 2115 may be performed by a shared channel transmission component as described with reference to FIGS. 12 through 15.

At 2120, the base station may determine, based on the first set of delay values, a first uplink resource for receiving a first acknowledgment feedback associated with the first downlink data transmission. The operations of 2120 may be performed according to the methods described herein. In some examples, aspects of the operations of 2120 may be performed by an ACK/NACK codebook manager as described with reference to FIGS. 12 through 15.

At 2125, the base station may monitor the first uplink resource for the first acknowledgment feedback. The operations of 2125 may be performed according to the methods described herein. In some examples, aspects of the operations of 2125 may be performed by an ACK/NACK feedback manager as described with reference to FIGS. 12 through 15.

Figure 22:
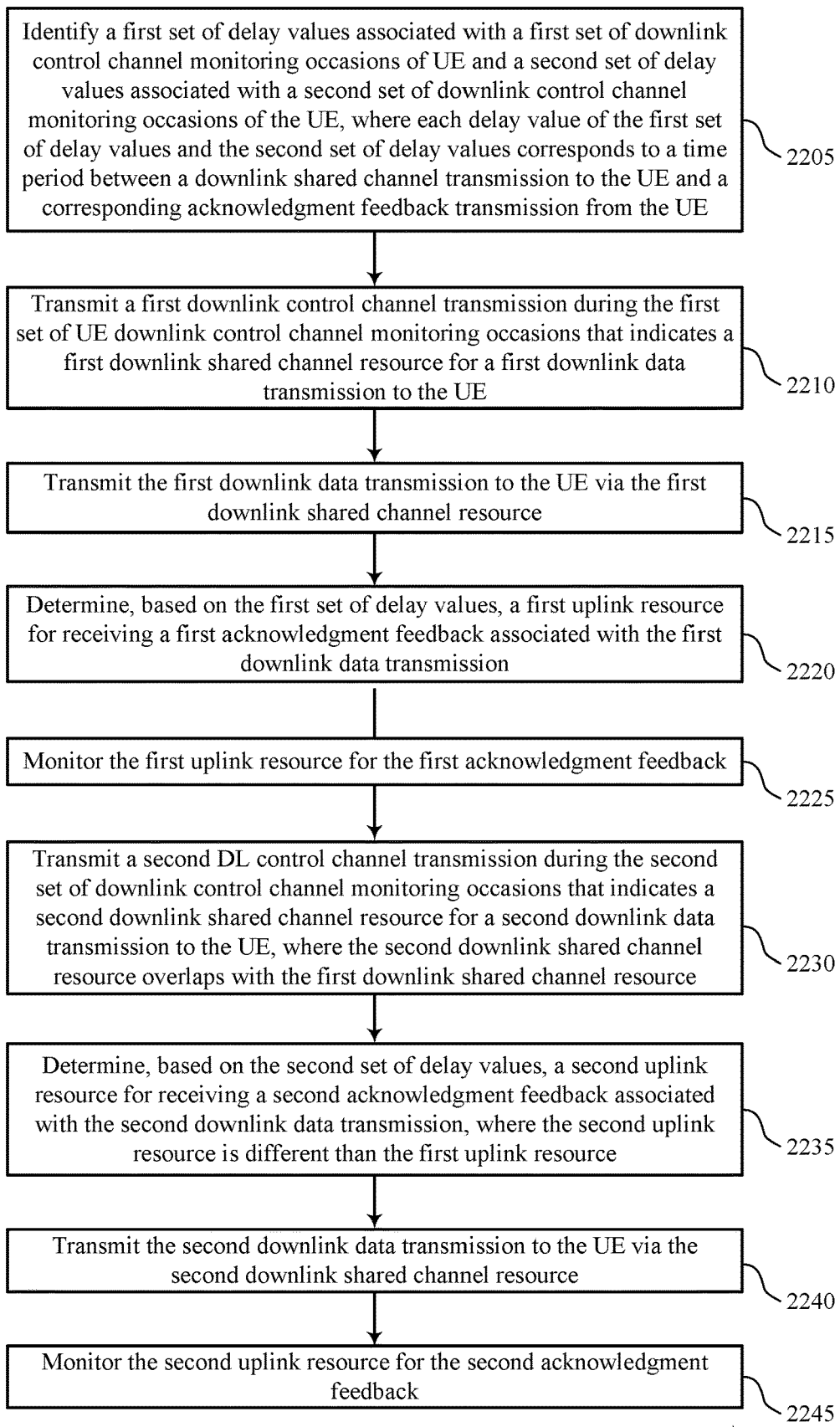

FIG. 22 shows a flowchart illustrating a method 2200 that supports acknowledgment feedback techniques in wireless communications in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may identify a first set of delay values associated with a first set of downlink control channel monitoring occasions of UE and a second set of delay values associated with a second set of downlink control channel monitoring occasions of the UE, where each delay value of the first set of delay values and the second set of delay values corresponds to a time period between a downlink shared channel transmission to the UE and a corresponding acknowledgment feedback transmission from the UE. The operations of 2205 may be performed according to the methods described herein. In some examples, aspects of the operations of 2205 may be performed by an ACK/NACK codebook manager as described with reference to FIGS. 12 through 15.

At 2210, the base station may transmit a first downlink control channel transmission during the first set of UE downlink control channel monitoring occasions that indicates a first downlink shared channel resource for a first downlink data transmission to the UE. The operations of 2210 may be performed according to the methods described herein. In some examples, aspects of the operations of 2210 may be performed by a resource allocation manager as described with reference to FIGS. 12 through 15.

At 2215, the base station may transmit the first downlink data transmission to the UE via the first downlink shared channel resource. The operations of 2215 may be performed according to the methods described herein. In some examples, aspects of the operations of 2215 may be performed by a shared channel transmission component as described with reference to FIGS. 12 through 15.

At 2220, the base station may determine, based on the first set of delay values, a first uplink resource for receiving a first acknowledgment feedback associated with the first downlink data transmission. The operations of 2220 may be performed according to the methods described herein. In some examples, aspects of the operations of 2220 may be performed by an ACK/NACK codebook manager as described with reference to FIGS. 12 through 15.

At 2225, the base station may monitor the first uplink resource for the first acknowledgment feedback. The operations of 2225 may be performed according to the methods described herein. In some examples, aspects of the operations of 2225 may be performed by an ACK/NACK feedback manager as described with reference to FIGS. 12 through 15.

At 2230, the base station may transmit a second downlink control channel transmission during the second set of downlink control channel monitoring occasions that indicates a second downlink shared channel resource for a second downlink data transmission to the UE, where the second downlink shared channel resource overlaps with the first downlink shared channel resource. The operations of 2230 may be performed according to the methods described herein. In some examples, aspects of the operations of 2230 may be performed by a resource allocation manager as described with reference to FIGS. 12 through 15.

At 2235, the base station may determine, based on the second set of delay values, a second uplink resource for receiving a second acknowledgment feedback associated with the second downlink data transmission, where the second uplink resource is different than the first uplink resource. The operations of 2235 may be performed according to the methods described herein. In some examples, aspects of the operations of 2235 may be performed by an ACK/NACK codebook manager as described with reference to FIGS. 12 through 15.

At 2240, the base station may transmit the second downlink data transmission to the UE via the second downlink shared channel resource. The operations of 2240 may be performed according to the methods described herein. In some examples, aspects of the operations of 2240 may be performed by a shared channel transmission component as described with reference to FIGS. 12 through 15.

At 2245, the base station may monitor the second uplink resource for the second acknowledgment feedback. The operations of 2245 may be performed according to the methods described herein. In some examples, aspects of the operations of 2245 may be performed by an ACK/NACK feedback manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, at a user equipment (UE), a first set of uplink resources for reporting a first acknowledgment feedback to a base station and a first set of delay values associated with the first set of uplink resources, wherein the first set of delay values is non-overlapping with a second set of delay values for reporting a second acknowledgment feedback to the base station, and wherein delay values of the first set of delay values and the second set of delay values are each associated with a corresponding time domain resource allocation of a downlink shared channel;

determining, based at least in part on the first set of delay values, one or more first time domain resource allocations of downlink shared channel resources that are to have feedback included with the first acknowledgment feedback; and transmitting the first acknowledgment feedback for the one or more first time domain resource allocations via the first set of uplink resources.

2. The method of claim 1, wherein the first set of delay values and the second set of delay values have same or different units for measuring time domain differences between a downlink data transmission and the first set of uplink resources.

3. The method of claim 2, wherein:
the units for measuring time domain differences include one or more of slots, sub-slots, orthogonal frequency division multiplexing (OFDM) symbols, or any combinations thereof.

4. The method of claim 1, wherein the first set of delay values is associated with a first wireless service having a first transmission time interval (TTI), and the second set of delay values is associated with a second wireless service having a second TTI that is shorter than the first TTI.

5. The method of claim 1, further comprising:
determining, based at least in part on the second set of delay values, a second time domain resource allocation of downlink shared channel resources associated with the second acknowledgment feedback, wherein the second time domain resource allocation has a same ending orthogonal frequency division multiplexing (OFDM) symbol as the one or more first time domain resource allocations and overlaps the one or more first time domain resource allocations; and transmitting the second acknowledgment feedback for the second time domain resource allocation via a second set of uplink resources that is different than the first set of uplink resources.

6. The method of claim 5, wherein the first set of uplink resources and the second set of uplink resources are different uplink resources within a same slot.

7. The method of claim 1, wherein the identifying comprises:
receiving, from the base station, configuration information that configures the first set of delay values and the second set of delay values.

8. The method of claim 7, wherein the configuration information comprises a downlink shared channel time domain resource allocation list that links the one or more first time domain resource allocations with the first set of delay values and that links a second time domain resource allocation of downlink shared channel resources with the second set of delay values.

9. The method of claim 8, wherein the first set of delay values and the second set of delay values are provided in a downlink data to uplink acknowledgment table that is provided with the downlink shared channel time domain resource allocation list.

10. The method of claim 1, wherein the first set of delay values correspond to downlink shared channel time domain resources that span a first number of orthogonal frequency division multiplexing (OFDM) symbols and the second set of delay values correspond to downlink shared channel time domain resources that span a second number of OFDM symbols.

11. The method of claim 10, wherein the first number of OFDM symbols span more than a threshold number of OFDM symbols and the second number of OFDM symbols is less than or equal to the threshold number of OFDM symbols.

12. The method of claim 10, wherein the second number of OFDM symbols are included in an enumerated set of numbers of OFDM symbols, and the first number of OFDM symbols correspond to other available numbers of OFDM symbols outside of the enumerated set of numbers of OFDM symbols.

13. The method of claim 1, wherein a plurality of overlapping downlink data transmissions from the base station each end during a same transmission time interval, and the first acknowledgment feedback is associated with latest starting data transmission of the plurality of overlapping downlink data transmissions, or is associated with a data transmission of the plurality of overlapping downlink data transmissions that has a shortest time duration.

14. A method for wireless communication, comprising:
identifying, at a user equipment (UE), a first set of delay values associated with a first set of downlink control channel monitoring occasions and a second set of delay values associated with a second set of downlink control channel monitoring occasions, wherein each delay value of the first set of delay values and the second set of delay values corresponds to a time period between a downlink shared channel transmission from a base station and a corresponding acknowledgment feedback transmission to the base station;

receiving a first downlink control channel transmission during the first set of downlink control channel monitoring occasions that indicates a first downlink shared channel resource for a first downlink data transmission to the UE;

determining, based at least in part on the first set of delay values, a first uplink resource for transmitting a first acknowledgment feedback associated with the first downlink data transmission;

monitoring the first downlink shared channel resource for the first downlink data transmission; and transmitting, based at least in part on the monitoring, the first acknowledgment feedback to the base station via the first uplink resource.

15. The method of claim 14, further comprising:
receiving a second downlink control channel transmission during the second set of downlink control channel monitoring occasions that indicates a second downlink shared channel resource for a second downlink data transmission to the UE, wherein the second downlink shared channel resource overlaps with the first downlink shared channel resource;

determining, based at least in part on the second set of delay values, a second uplink resource for transmitting a second acknowledgment feedback associated with the second downlink data transmission, wherein the second uplink resource is different than the first uplink resource;

monitoring the second downlink shared channel resource for the second downlink data transmission; and transmitting the second acknowledgment feedback to the base station via the second uplink resource.

16. The method of claim 15, wherein the first set of downlink control channel monitoring occasions correspond to downlink control channel monitoring occasions within an initial number of orthogonal frequency division multiplexing (OFDM) symbols of a slot, and the second set of downlink control channel monitoring occasions correspond to downlink control channel monitoring occasions that are after the initial number of OFDM symbols of the slot.

17. The method of claim 16, wherein the initial number of OFDM symbols corresponds to up to three initial symbols of the slot.

18. The method of claim 15, wherein the first uplink resource and the second uplink resource correspond to different feedback bits in a same uplink control channel transmission.

19. The method of claim 15, wherein the first set of delay values is associated with a first wireless service having a first transmission time interval (TTI), and the second set of delay values is associated with a second wireless service having a second TTI that is shorter than the first TTI.

20. The method of claim 19, wherein:
the first wireless service is associated with downlink shared channel resources that span more than a threshold number of orthogonal frequency division multiplexing (OFDM) symbols, and the second wireless service is associated with downlink shared channel resources that span a number of OFDM symbols that is less than or equal to the threshold number of OFDM symbols, or
the second wireless service is associated with downlink shared channel resources that span a number of orthogonal frequency division multiplexing (OFDM) symbols that are included in an enumerated set of numbers of OFDM symbols, and the first wireless service is associated with downlink shared channel resources that span numbers of OFDM symbols that are outside of the enumerated set of numbers of OFDM symbols.

21. The method of claim 19, wherein the second wireless service is associated with downlink control channel monitoring occasions that are after an initial number of orthogonal frequency division multiplexing (OFDM) symbols of the TTI.

22. A method for wireless communication, comprising:
identifying, at a base station, a first set of uplink resources for receiving a first acknowledgment feedback from a user equipment (UE) and a first set of delay values associated with the first set of uplink resources, wherein the first set of delay values indicate one or more first time domain resource allocations of a downlink shared channel that are to have feedback provided in the first acknowledgment feedback;
identifying, at the base station, a second set of uplink resources for receiving a second acknowledgment feedback from the UE and a second set of delay values associated with the second set of uplink resources, wherein the first set of delay values is non-overlapping with the second set of delay values, and wherein the second set of delay values indicate one or more second time domain resource allocations of the downlink shared channel that are to have feedback provided in the second acknowledgment feedback;
transmitting a first downlink data transmission to the UE using a first time domain resource allocation associated with the first set of delay values, and a second downlink data transmission to the UE using a second time domain resource allocation associated with the second set of delay values, wherein the second time domain resource allocation is at least partially overlapping with the first time domain resource allocation; and
monitoring, responsive to the transmitting, the first set of uplink resources for the first acknowledgment feedback from the UE and the second set of uplink resources for the second acknowledgment feedback from the UE.

23. The method of claim 22, wherein the first set of delay values is associated with a first wireless service having a first transmission time interval (TTI), and the second set of delay values is associated with a second wireless service having a second TTI that is shorter than the first TTI.

24. The method of claim 22, wherein the second time domain resource allocation has a same ending orthogonal frequency division multiplexing (OFDM) symbol as the first time domain resource allocation and overlaps the first time domain resource allocation.

25. The method of claim 22, further comprising:
transmitting, to the UE, configuration information that configures the first set of delay values and the second set of delay values, wherein the configuration information comprises a downlink shared channel time domain resource allocation list that links the one or more first time domain resource allocations with the first set of delay values and that links the one or more second time domain resource allocations of downlink shared channel resources with the second set of delay values.

26. The method of claim 25, wherein the first set of delay values and the second set of delay values are provided in a downlink data to uplink acknowledgment table that is provided with the downlink shared channel time domain resource allocation list.

27. The method of claim 22, wherein the first set of delay values and the second set of delay values have same or different units for measuring time domain differences between a downlink data transmission and the first set of uplink resources, and wherein the units for measuring time domain differences include one or more of slots, sub-slots, orthogonal frequency division multiplexing (OFDM) symbols, or any combinations thereof.

28. The method of claim 22, wherein the first set of delay values correspond to downlink shared channel time domain resources that span a first number of orthogonal frequency division multiplexing (OFDM) symbols and the second set of delay values correspond to downlink shared channel time domain resources that span a second number of OFDM symbols.

29. The method of claim 22, wherein a plurality of overlapping downlink data transmissions from the base station each end during a same transmission time interval, and the first acknowledgment feedback is associated with latest starting data transmission of the plurality of overlapping downlink data transmissions, or the first acknowledgment feedback is associated with a data transmission of the plurality of overlapping downlink data transmissions that has a shortest time duration.

30. A method for wireless communication, comprising:
identifying, at a base station, a first set of delay values associated with a first set of downlink control channel monitoring occasions of user equipment (UE) and a second set of delay values associated with a second set of downlink control channel monitoring occasions of the UE, wherein each delay value of the first set of delay values and the second set of delay values corresponds to a time period between a downlink shared channel transmission to the UE and a corresponding acknowledgment feedback transmission from the UE;
transmitting a first downlink control channel transmission during the first set of UE downlink control channel monitoring occasions that indicates a first downlink shared channel resource for a first downlink data transmission to the UE;

transmitting the first downlink data transmission to the UE via the first downlink shared channel resource;

determining, based at least in part on the first set of delay values, a first uplink resource for receiving a first acknowledgment feedback associated with the first downlink data transmission; and monitoring the first uplink resource for the first acknowledgment feedback.

31. The method of claim 30, further comprising:

transmitting a second downlink control channel transmission during the second set of downlink control channel monitoring occasions that indicates a second downlink shared channel resource for a second downlink data transmission to the UE, wherein the second downlink shared channel resource overlaps with the first downlink shared channel resource;

determining, based at least in part on the second set of delay values, a second uplink resource for receiving a second acknowledgment feedback associated with the second downlink data transmission, wherein the second uplink resource is different than the first uplink resource;

transmitting the second downlink data transmission to the UE via the second downlink shared channel resource; and monitoring the second uplink resource for the second acknowledgment feedback.

32. The method of claim 31, wherein the first set of downlink control channel monitoring occasions correspond to downlink control channel monitoring occasions within an initial number of orthogonal frequency division multiplexing (OFDM) symbols of a slot, and the second set of downlink control channel monitoring occasions correspond to downlink control channel monitoring occasions that are after the initial number of OFDM symbols of the slot.

33. The method of claim 31, wherein the first set of delay values is associated with a first wireless service having a first transmission time interval (TTI), and the second set of delay values is associated with a second wireless service having a second TTI that is shorter than the first TTI.

34. The method of claim 33, wherein:

the first wireless service is associated with downlink shared channel resources that span more than a threshold number of orthogonal frequency division multiplexing (OFDM) symbols, and the second wireless service is associated with downlink shared channel resources that span a number of OFDM symbols that is less than or equal to the threshold number of OFDM symbols, or the second wireless service is associated with downlink shared channel resources that span a number of orthogonal frequency division multiplexing (OFDM) symbols that are included in an enumerated set of numbers of OFDM symbols, and the first wireless service is associated with downlink shared channel resources that span numbers of OFDM symbols that are outside of the enumerated set of numbers of OFDM symbols.

35. The method of claim 33, wherein the second wireless service is associated with downlink control channel monitoring occasions that are after an initial number of orthogonal frequency division multiplexing (OFDM) symbols of the TTI.

36. The method of claim 33, wherein the first wireless service is associated with downlink shared channel resources that span a more than a threshold number of orthogonal frequency division multiplexing (OFDM) symbols and the second wireless service is associated with downlink shared channel resources that span a number of OFDM symbols that are less than or equal to the threshold number of OFDM symbols.

37. An apparatus for wireless communication, comprising: a processor, memory coupled with the processor; and instructions stored in the memory and executable by the processor to cause the apparatus to:

identify, at a user equipment (UE), a first set of uplink resources for reporting a first acknowledgment feedback to a base station and a first set of delay values associated with the first set of uplink resources, wherein the first set of delay values is non-overlapping with a second set of delay values for reporting a second acknowledgment feedback to the base station, and wherein delay values of the first set of delay values and the second set of delay values are each associated with a corresponding time domain resource allocation of a downlink shared channel;

determine, based at least in part on the first set of delay values, one or more first time domain resource allocations of downlink shared channel resources that are to have feedback included with the first acknowledgment feedback; and transmit the first acknowledgment feedback for the one or more first time domain resource allocations via the first set of uplink resources.

38. The apparatus of claim 37, wherein the instructions are further executable by the processor to cause the apparatus to:

determine, based at least in part on the second set of delay values, a second time domain resource allocation of downlink shared channel resources associated with the second acknowledgment feedback, wherein the second time domain resource allocation has a same ending orthogonal frequency division multiplexing (OFDM) symbol as the one or more first time domain resource allocations and overlaps the one or more first time domain resource allocations; and transmit the second acknowledgment feedback for the second time domain resource allocation via a second set of uplink resources that is different than the first set of uplink resources.

39. The apparatus of claim 37, wherein the instructions are further executable by the processor to cause the apparatus to:

receive, from the base station, configuration information that configures the first set of delay values and the second set of delay values, wherein the configuration information comprises a downlink shared channel time domain resource allocation list that links the one or more first time domain resource allocations with the first set of delay values and that links a second time domain resource allocation of downlink shared channel resources with the second set of delay values.

40. An apparatus for wireless communication, comprising: a processor, memory coupled with the processor; and instructions stored in the memory and executable by the processor to cause the apparatus to:

identify, at a user equipment (UE), a first set of delay values associated with a first set of downlink control channel monitoring occasions and a second set of delay values associated with a second set of downlink control channel monitoring occasions, wherein each delay value of the first set of delay values and the second set of delay values corresponds to a time period between a downlink shared channel transmission from a base station and a corresponding acknowledgment feedback transmission to the base station;

receive a first downlink control channel transmission during the first set of downlink control channel monitoring occasions that indicates a first downlink shared channel resource for a first downlink data transmission to the UE;

determine, based at least in part on the first set of delay values, a first uplink resource for transmitting a first acknowledgment feedback associated with the first downlink data transmission;

monitor the first downlink shared channel resource for the first downlink data transmission; and transmit, based at least in part on the monitoring, the first acknowledgment feedback to the base station via the first uplink resource.

41. The apparatus of claim 40, wherein the instructions are further executable by the processor to cause the apparatus to:

receive a second downlink control channel transmission during the second set of downlink control channel monitoring occasions that indicates a second downlink shared channel resource for a second downlink data transmission to the UE, wherein the second downlink shared channel resource overlaps with the first downlink shared channel resource;

determine, based at least in part on the second set of delay values, a second uplink resource for transmitting a second acknowledgment feedback associated with the second downlink data transmission, wherein the second uplink resource is different than the first uplink resource;

monitor the second downlink shared channel resource for the second downlink data transmission; and transmit the second acknowledgment feedback to the base station via the second uplink resource.

42. The apparatus of claim 41, wherein the first set of downlink control channel monitoring occasions correspond to downlink control channel monitoring occasions within an initial number of orthogonal frequency division multiplexing (OFDM) symbols of a slot, and the second set of downlink control channel monitoring occasions correspond to downlink control channel monitoring occasions that are after the initial number of OFDM symbols of the slot.

43. The apparatus of claim 41, wherein the first set of delay values is associated with a first wireless service having a first transmission time interval (TTI), and the second set of delay values is associated with a second wireless service having a second TTI that is shorter than the first TTI.

44. The apparatus of claim 43, wherein:

the first wireless service is associated with downlink shared channel resources that span more than a threshold number of orthogonal frequency division multiplexing (OFDM) symbols, and the second wireless service is associated with downlink shared channel resources that span a number of OFDM symbols that is less than or equal to the threshold number of OFDM symbols, or the second wireless service is associated with downlink shared channel resources that span a number of orthogonal frequency division multiplexing (OFDM) symbols that are included in an enumerated set of numbers of OFDM symbols, and the first wireless service is associated with downlink shared channel resources that span numbers of OFDM symbols that are outside of the enumerated set of numbers of OFDM symbols.

* * * * *